United States Patent [19]

Shigihara

[11] Patent Number: 6,067,121
[45] Date of Patent: *May 23, 2000

[54] SCRAMBLED BROADCAST SYSTEM

[75] Inventor: Hideo Shigihara, Saitama-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/659,530

[22] Filed: Jun. 6, 1996

[30] Foreign Application Priority Data

| Jun. 7, 1995 | [JP] | Japan | 7-140756 |
| Jun. 7, 1995 | [JP] | Japan | 7-140757 |
| Jun. 7, 1995 | [JP] | Japan | 7-140758 |

[51] Int. Cl.⁷ .............. H04N 5/63; H04N 7/00; H04N 11/00
[52] U.S. Cl. .............. 348/473; 348/730; 348/460; 348/461
[58] Field of Search .............. 348/730, 5.5, 460, 348/461, 474, 552, 10, 473; H04N 5/63, 7/00, 11/00

[56] References Cited

U.S. PATENT DOCUMENTS

| 4,787,085 | 11/1988 | Suto et al. | 348/6 |
| 5,005,013 | 4/1991 | Tsukamoto et al. | 348/729 |
| 5,523,794 | 6/1996 | Mankovitz et al. | 348/460 |
| 5,552,833 | 9/1996 | Henmi et al. | 348/460 |
| 5,600,573 | 2/1997 | Hendricks et al. | 348/6 |
| 5,635,979 | 6/1997 | Kostreski et al. | 348/10 |
| 5,659,366 | 8/1997 | Kerman | 348/460 |
| 5,661,526 | 8/1997 | Hamamoto et al. | 348/468 |

*Primary Examiner*—Nathan Flynn
*Assistant Examiner*—Vivek Srivastava
*Attorney, Agent, or Firm*—Pillsbury Madison & Sutro, LLP

[57] ABSTRACT

A scrambled broadcast system including a scrambler having a first generator for generating a first redundancy added data by adding a first redundancy data which changes over time to a message data, a second generator for generating a second redundancy added data by adding a second redundancy data which is obtained by executing a predetermined operation to the first redundancy added data generated in tho first generator, and an encryptor for executing a predetermined encrypting processing to the second redundancy added data generated in the second generator, a descrambler having a restoring unit for restoring the second redundancy added data by decrypting the encrypted data output from the decryptor, a discriminator for discriminating whether the operation operated in the second generator is realized to the second redundancy added data restored in the restoring unit or not and discriminating the rightness of the message data which is made by removing the first and the second redundancy data from the second redundancy added data.

7 Claims, 26 Drawing Sheets

Fig. 1
(PRIOR ART)

| ORIGINAL DATA → | 9 | 4 | 3 | 4 | |
|---|---|---|---|---|---|
| BIT "3" | 1 | 0 | 0 | 0 | 8 |
| BIT "2" | 0 | 1 | 0 | 1 | 5 |
| BIT "1" | 0 | 0 | 1 | 0 | 2 |
| BIT "0" | 1 | 0 | 1 | 0 | A |
| | BIT "3'" | BIT "2'" | BIT "1'" | BIT "0'" | ENCRYPTED DATA ↑ |

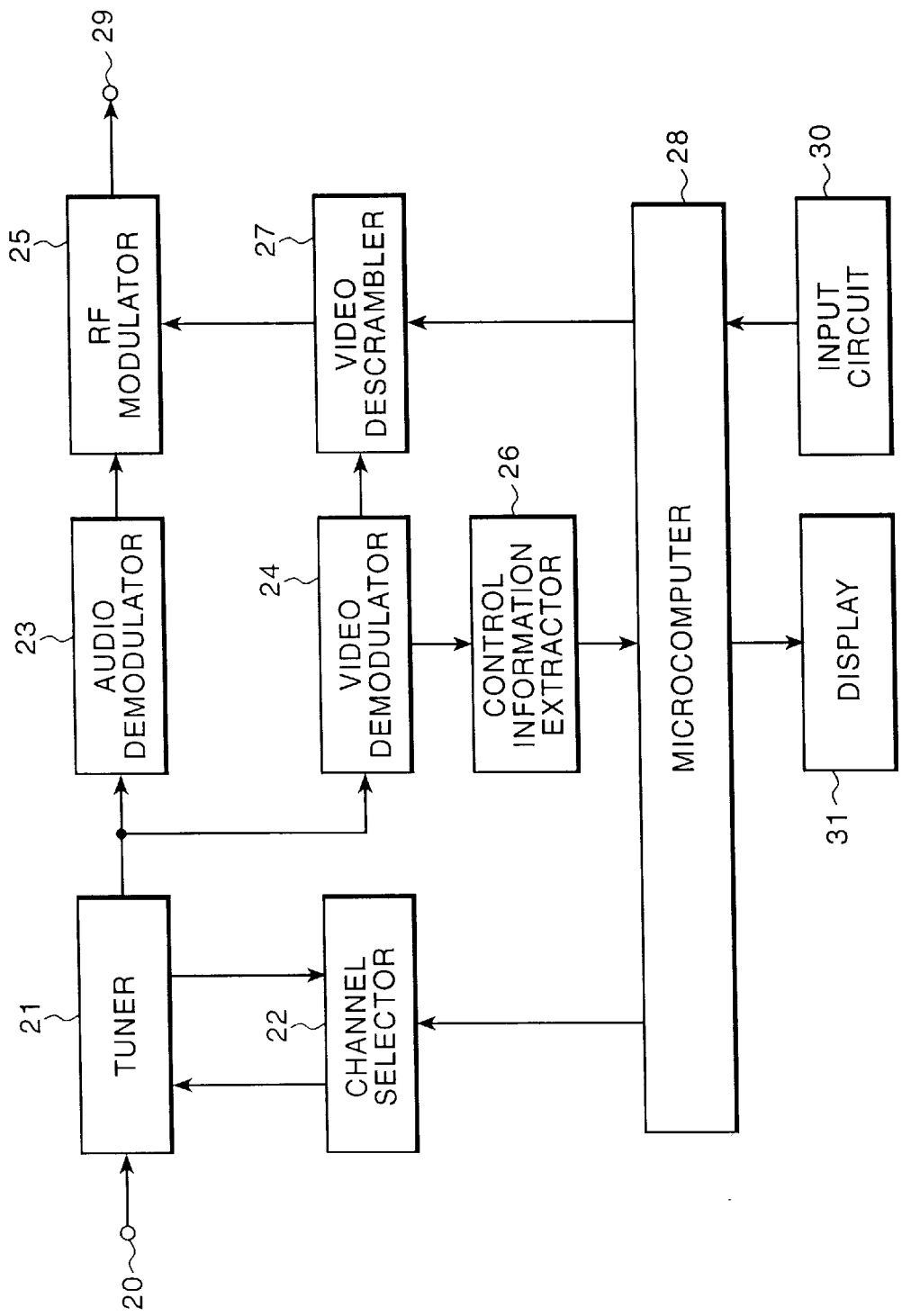

Fig. 9

| ORIGINAL DATA → | 9 | 4 | 4 | 7 | |
|---|---|---|---|---|---|
| BIT "3" | 1 | 0 | 0 | 0 | 8 |
| BIT "2" | 0 | 1 | 1 | 1 | 7 |
| BIT "1" | 0 | 0 | 0 | 1 | 1 |
| BIT "0" | 1 | 0 | 0 | 1 | 9 |
| | BIT "3'" | BIT "2'" | BIT "1'" | BIT "0'" | ENCRYPTED DATA ↑ |

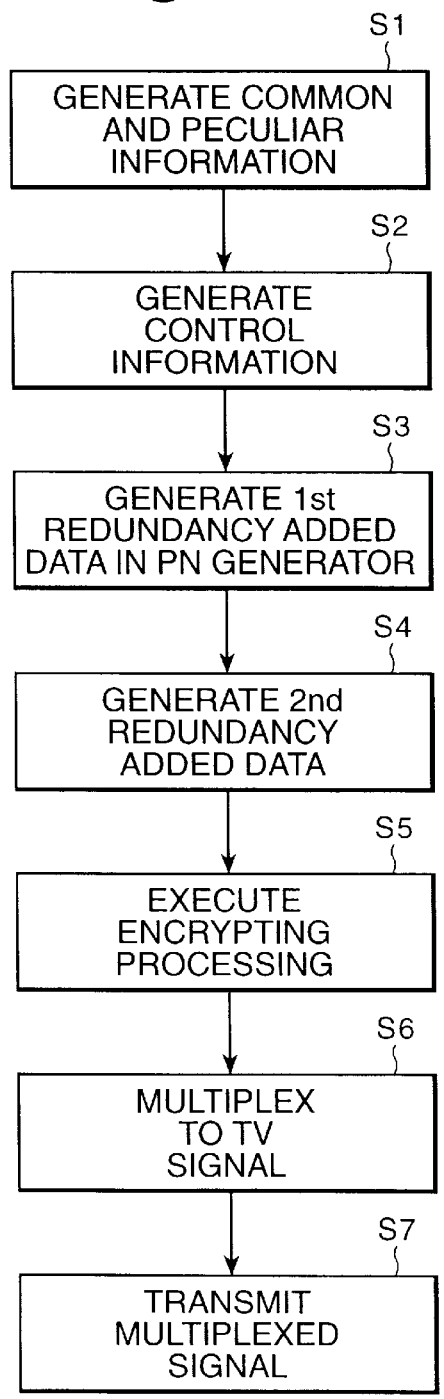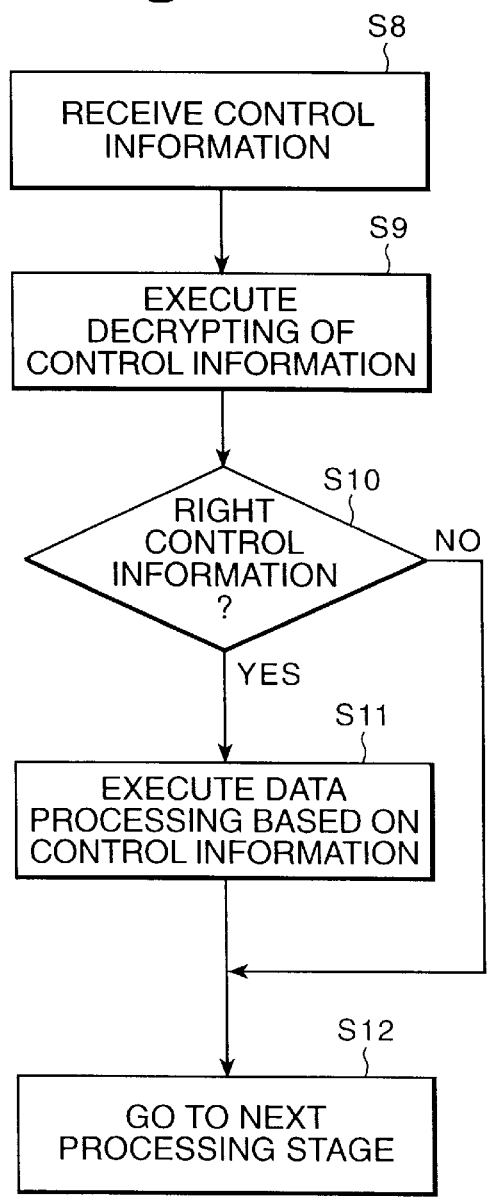

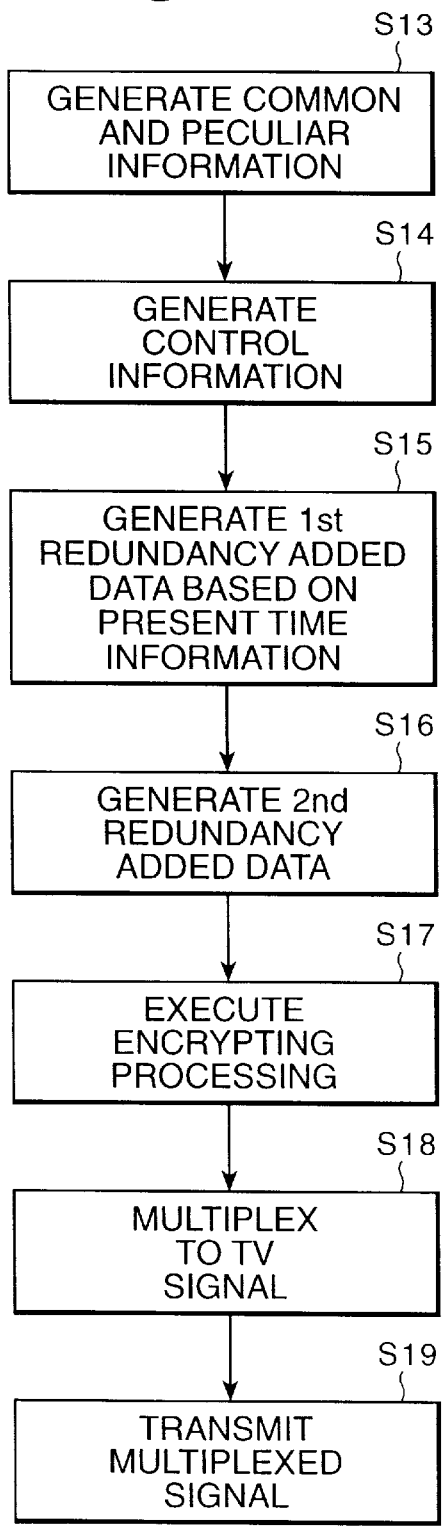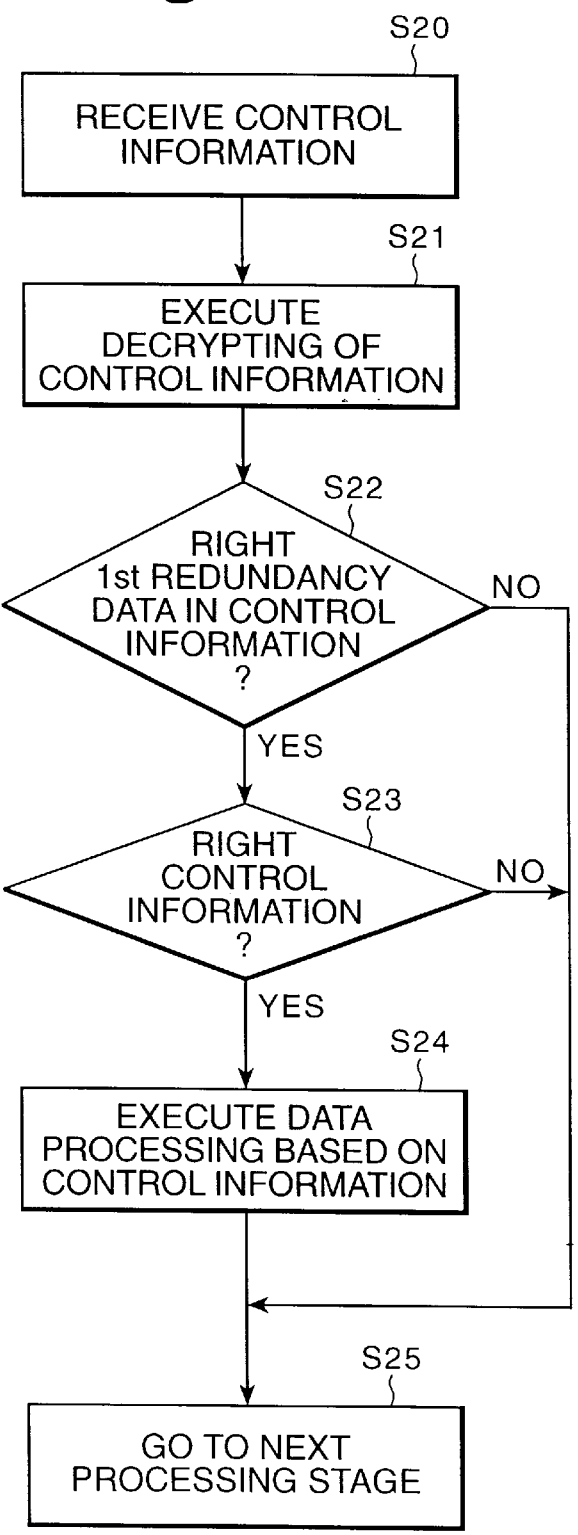

SCRAMBLED BROADCAST SYSTEM

FIELD OF THE INVENTION

The present invention generally relates to a subscriber television broadcast system such as a CATV (cable television) broadcast system and a satellite broadcast system, more particularly, to an improved scrambled broadcast system which executes a scrambling of data to be broadcasted and transmits the data and executes a descrambling at the receiver terminal.

BACKGROUND OF THE INVENTION

As is generally known, it is necessary for the scrambled broadcast system to execute the scrambling to transmit not only a television signal which contains a video signal or an audio signal to a receiver terminal of each subscriber from the broadcast station but to control information for controlling the receiver terminal.

In the conventional scrambling, the message data to be transmitted is first subjected to redundancy adding processing, and then is subjected to the decrypting processing which is composed by the first and the second processings. For instance, if the message data is "83", it executes the redundancy adding processing by adding the fixed redundancy data "23" to the message data so as to generate a redundancy added data "8323".

Then by adding 1 to each digit of the redundancy added data "8323", $$8+1=9$$
$$3+1=4$$
$$2+1=3$$
$$3+1=4$$

the first operation processing for generating data "9434" is executed.

From the original data "9424" which is achieved by the first operation processing, the digits are converted into the binary numbers as shown in FIG. 1 as the bits "3" (MSB) through "0" (LSB) in the table, and then these are also converted into hexadecimal numbers by reading out the bits "3" (MSB) through "0" (LSB) laterally in the table and then reading out the hexadecimal numbers starting from the bottom "A" to the top "8" vertically in the table. Thus, the second operation processing for producing an encrypted data "A258" is executed. Therefore, the message data "83" is scrambled to be the data "A258".

Further, at the receiver terminal the same processing is executed on the received data in the reverse order, so as to discriminate whether a tampering has been made in the course of transmission by determining whether the added redundancy data "23" is reproduced or not.

However, in the conventional scrambled television broadcast system, the redundancy added data is fixed and the scrambling of the same message data always results in the same data. So, there are problems in that, when the message is transmitted over and over, the possibility of decrypting the message becomes high and tampering is easily executed.

As is generally known, it is necessary in subscriber television broadcast systems to transmit not only a television signal carrying a video signal and an audio signal but also control information for controlling a receiver terminal to the receiver terminal of each subscriber.

In the transmission systems for the control information, there are two kinds of control, i.e., an outband control and an inband control. The former is for independently transmitting the television signal and the control information through separate transmission channels, and the latter is for transmitting them using a common transmission channel by multiplexing the control information to the television signal.

The inband control is more useful than the outband control since it does not need separate transmission lines, and it can be put into practice in the future. However, in the inband control, the control information is not always transmitted by multiplexing it to the television signals in all channels. For instance, in some channels it is transmitted by multiplexing it to the television signals, and in some channels it is not multiplexed to the television signals at all. Furthermore, when it is transmitted by multiplexing it to the television signal in some channel, it may be transmitted at regular or irregular intervals.

Thus, in the conventional receiver terminal, the latest control information is obtained by controlling the receiver to automatically receive the channel containing the control information at all times except when a channel which does not contain the control information is selected by a user, especially when the power switch of the receiver terminal is turned OFF. However, since when the channel containing the control information is received the power is kept applied to most circuits of the receiver terminal, there is an economical disadvantage which results from high power consumption, and some measures must be taken in response to the generated heat.

One example of the subscriber pay television broadcast system is presented in "Report to Technical Conditions on a Pay Television Broadcast System by Satellite Broadcast" (hereinafter referred as Document 1) submitted in November 1988 in response to the inquiry from the Telecommunicating Technical Council.

FIG. 2 shows the arrangement of the pay broadcast system presented in Bibliography 1 and a PN (pseudo random noise) signal adding system which is used as the scramble system.

In the pay broadcast system, a broadcast signal transmitted from a broadcast station 110 to a decryptor 210 contains scrambled video signals and sub-signals. The sub-signals contain scrambled digital audio signals, program information and peculiar information regarding the decryptor 210.

At the broadcast station 101 using a decryptor ID in peculiar information regarding the decryptor 210 including a work-key Kw, subscription conditions and the decryptor ID, a muster-key Kmi is obtained from a master-key file 110g to encrypt the peculiar information in an encryptor 110f using the master-key Kmi. Further, using the work-key Kw, program information such as the scramble-key Ks, a broadcast station ID, service information, date information, etc. are encrypted in an encryptor 110e.

Although details of the scramble system will not be described here as it is not directly concerned with the present invention, video and audio signals are scrambled in a video scrambler 110a and an audio scrambler 110b using the PN signal. The PN signals for scrambling are random data which change successively. and the signals are fed from a PN signal generator 110c. The initial state of the PN signal generator 110c is set up by the scramble-key Ks.

The scrambled audio signals are multiplexed with timing information which initializes the PN generator 110c, encrypted program information and peculiar information in a multiplexer 110d and provides sub-signals as a result of such multiplexing. The sub-signals and the scrambled video signals are output from the broadcast station 110 as a broadcast signal (radio broadcast signal).

A privacy of the broadcast signal is enhanced by the triple encrypted structure using the work-key Kw, the master-key Kmi and the scramble-key Ks. Further, the peculiar information can be sent to the subscriber terminal decryptor 210 through a telephone line or an IC card.

In the decryptor 210, audio signal, program information and peculiar information are extracted from the sub-signal of the broadcast signal in an extractor 120d. The extracted peculiar information is decrypted and restored at a decryptor 210f of using the master-key which has been imparted beforehand to the decryptor. As the decrypting can be correctly executed only by the same master-key Kmi as for the encrypting in the encryptor 210f, the decryptor imparted with the master-key Kmi is able to decode the peculiar information.

Program information is decrypted in a decryptor 210e using the work-key Kw from the encrypted peculiar information received in the receiver. In this case, unless using the same work-key Kw for the encrypting in the encryptor 210e, the program information cannot be correctly decrypted.

The program information and peculiar information thus obtained are collated in a subscription condition collator 210g. Here, when both subscription conditions agree with each other it is determined that the information can be descrambled, and a PN generator 210c is placed in the operating state by the determining signal.

The PN generator 210c generates the PN signal using the scramble-key Ks of the program information which is obtained in the decryptor 210e. In the video descrambler 210a and the audio descrambler 210b, the descrambling is executed through addition, etc. using the PN signal.

The scramble-key Ks is information essential to descrambling video and audio signals and only when it is the same value as in the scrambling can the audio and video signals be descrambled to be output. As the work-key Kw is needed to restore the scramble-key Ks, a decryptor that does not have the work-key Kw cannot obtain the proper descramble-key Ks.

Further, peculiar information containing the work-key Kw is transmitted from the broadcast station 110 to make the work-key Kw changeable so as to supply the peculiar information to a decryptor of a subscriber who desires to continue the subscription. And to restore the peculiar information containing the work-key Kw, the master-key Kmi is needed and only a decryptor that has the master-key Kmi can receive the peculiar information.

The master-key Kmi is set at a different value in every peculiar decryptor. The values are factory-preset before their delivery to subscribers.

In such a decryptor used in the pay broadcast system as described above, such processings as encrypting/decrypting, and collating of subscription conditions in a decryptor are generally executed using a data processing system which uses a microcomputer (hereinafter referred as the microcomputer system). A circuit containing the microcomputer system is incorporated intp an IC card so as to make it exchangeable. FIG. 3 shows an example of the structure of a decryptor which executes the encrypting/decrypting processing and the collation of subscription conditions using the IC card.

The decryptor, as shown in FIG. 3, has the same arrangement as the decryptor 210 shown in FIG. 2 and a microcomputer system for executing the processing is incorporated into an IC card 220. The IC card 220 and the main body of the decryptor can communicate signals through a connector.

The IC card 220 has non-volatile memories 210j and 210k (hereinafter referred to the master-key housing memory and the ID housing memory) such as a ROM for storing the master-key Kmi, and an ID collator 210h is provided in the main body of the decryptor. The ID contained in the peculiar information extracted from the sub-signal of the broadcast signal is collated with the ID in the IC cord 220 in the ID collator, and the peculiar information is fed to the IC card 220 when both ID agree with each other.

When program information and peculiar information are decrypted (210e, 210f) to collate the subscription conditions and these conditions agree with each other, a switch 210i is turned ON and the scramble-key is fed to the PN generator 210c. Thus, the peculiar information is selected and subscribers are limited to those who subscribe to the peculiar information being fed to the IC card 220. Here, the ID collator 210h is a circuit required as the communication data velocity with the IC card 220 is limited.

FIG. 4 shows the arrangement of the PN generator 210c shown in Bibliography 1. The PN generator is comprised of linear feedback shift registers (LFSR) 211a, 211b and 211c and nonlinear function (NF) logic 212a, 212b and 212c.

The scramble-key Ks is taken into the LFSRs 211a through 211c for initializing the PN generator when there are load timing pulses obtained from the sub-signal of the broadcast signal. 13 bits of the scramble-key Ks are fed to registers of the LFSR 211a, 11 bits are fed to registers of the LFSR 211b, and 8 bits are fed to registers of the LFSR 211c.

As a general arrangement of the LFSRs 211a through 211c, it is generally known to generate M-series PN code as shown in FIG. 5. The LFSRs are comprised of an n-stage shift register 2111 and an EX-OR 2112, wherein a k-th state (1 □ k □ n) of the shift register 2111 is sequentially subjected to the EX-OR operation and fed to the first stage of the shift register 2111 as an input. A shift clock is fed to the shift register 2111 so as to change the stages.

A shift clock which is synchronizing with the audio signal and the video signal has been fed to the LFSRs 211a through 212c and outputs from six registers in the LFSRs 211a through 211c are fed to the NF logics 212a through 211c.

The NF logics 212a through 212c are constructed using a ROM and convert 6-bit outputs from the LFSRs 211a through 211c by a fixed nonlinear logic according to mask patterns to output them by 1-bit.

A selector switch 214 changes over the NF logics 212a and 212c according to the switching signal from the NF logic 212b and provides the outputs to an exclusive OR (EX-OR) circuit 213. The output from a register cell of the LFSR 211a has been fed to the EX-OR 213 and the output of the NF logic 212a or the NF logic 212c is applied to the video descrambler 210a and the audio descrambler 210b as the ON signal.

The states of the LFSR 211a through 211c are shifted from the initial state when the scramble-key Ks wan fed according to the shift clock and the outputs of the NF logics 212a through 212c also shift following the shift of the states. Thus, the descramble is executed using the random PN signal obtained from the state which randomly varies.

Although the NF logics 212a through 212c are used in this example, there is such an arrangement where 1-bit register outputs of the LFSR 211a through 211c are fed directly to the selector switch 214 or the EX-OR 213 or used the PN signal.

However, in the conventional decryptor, the system security may be reduced if the master-key Kmi, the decrypting algorithm and mechanism of the PN generator are known to persons skilled in the art. Therefore, for example, in the example shown in FIG. 2 it is required to incorporate the video descrambler 210a, audio descrambler 210b, the PH generator 210c and personal computer system which are used in the decryptor 210 in a single IC chip.

Further, in case of a decryptor using the IC card 220 as shown in FIG. 3, there was a problem that the arrangement of the PN generator 210c becomes easily known to persons skilled in the art from the relation of the scramble-key Ks and the PN signal because the scramble-key Ks is fed to the PN generator 210c from the IC card 220.

SUMMARY OF THE INVENTION

It is, therefore, an object of the present invention to provide an extremely superior scrambled broadcast system which makes it possible to prevent message data from being decrypted without proper authorization by making the results of the same message data be different over time.

Another object of the present invention is to provide a television signal receiving apparatus which is able to surely receive the control information without the high power consumption and the generation of heat.

Still another object of the present invention is to provide a decryptor of the scrambled broadcast system which solves the abovementioned problems, enhance the security, and contributes to the prevention of unauthorized use with a simple arrangement.

One aspect of the scrambled broadcast system according to the present invention includes a scrambler having a first generator for generating a first redundancy added data by adding a first redundancy data which changes over time to a message data, a second generator for generating a second redundancy added data by adding a second redundancy data which is obtained by executing a predetermined operation to the first redundancy added data generated in the first generator, and an encryptor for executing a predetermined encrypting processing to the second redundancy added data generated in the second generator, a descrambler having a restoring unit for restoring the second redundancy added data by decrypting the encrypted data output from the decryptor, a discriminator for discriminating whether the operation carried out in the second generator is realized to the second redundancy added data restored in the restoring unit or not and discriminating the correctness of the message data which is made by removing the first and the second redundancy data from the second redundancy added data.

According to the above arrangement, since the first redundancy added data is generated by adding the first redundancy data which changes over time to a message data, and also the second redundancy added data is generated by adding the second redundancy data which is obtained by executing a predetermined operation to the first redundancy added data, the second redundancy added data is encrypted by making the results of the scrambling of the same message data be different over time so as to prevent the message data from being decrypted without proper authorization.

The television signal receiving apparatus according to the present invention is provided for receiving a television signal to which the control information for controlling the receiver terminal is multiplexed. The television signal receiving apparatus is based on the control information multiplexed to the television signal. Furthermore, it is provided with channel selecting means for selecting a channel where the control information is multiplexed to the television signal in the state that the power switch is turned OFF and control means for cutting off the power supply to the selecting means when the control information is obtained from the channel selected in the channel selecting means.

According to the above arrangement. since the channel where the control information is multiplexed to the television signal is selected when the power switch is turned OFF and the power supply to the channel selecting means is cut off when the control information is obtained from the selected channel, it is possible to surely receive the control information without the high power consumption and the generation of heat.

The decryptor used in a scrambled broadcast system scrambles video and/or audio signals at the broadcast station using a PN signal, encrypts and multiplexes the descramble key information to other sub-information and broadcasts it with the scramble signal, and descrambles the received scrambled broadcast signal using the PN signal to convert it into the receivable video and audio signals. It is provided with a decryptor for decrypting the received encrypted information, a receiver terminal to extract the sub-information, a key information determining unit for distinguishing the truth of the key information obtained in the decrypting means, a PN signal generator for generating the PN signal sequentially varying from the state set up by the key information when it is distinguished as the truth in the key information determining means based on a conversion logic which is changeable based on the changing information, and a PN signal generating logic changing unit for extracting a specific data as the changing information from the sub-information obtained in the decrypting means and changing the PN signal generating logic based on the changing information.

The PN signal generating logic changing means it is contained in the sub-information and it extracts a specific data changed voluntarily at the broadcast station as a changing information.

Further, it has many specific data contained in the sub-information and uses a specific data specified by the changing information specifying data contained in the sub-information as the changing information.

It also specifies the changing information as the final decision based on an area information showing its broadcasting area.

In the decryptor of the scrambled broadcast system according to the arrangement as described above, since it is possible to change the PN signal generating logic required for the descrambling based on the specific data in the sub-information fed from the broadcast station, the PN signal can be changeable voluntarily from the broadcast station and the security of the system also can be improved.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a table for explaining a conventional scrambled broadcast system;

FIG. 8 is a block diagram showing the detail of the receiver terminal in the embodiment of FIG. 6;

FIG. 9 is a table for explaining the scrambling in the embodiment of FIG. 6;

FIG. 10 is a flow chart for explaining the operation of the central site in the embodiment of FIG. 6;

FIG. 11 is a flow chart for explaining the operation of the receiver terminal in the embodiment of FIG. 6;

FIG. 12 is a flow chart for explaining still another operation of the embodiment of FIG. 6;

FIG. 13 is a flow chart for explaining together with FIG. 12 the operation of the embodiment of FIG. 6;

FIG. 22 is a flow chart for explaining still another operation of the embodiment of FIG. 16;

DESCRIPTION OF THE PREFERRED EMBODIMENTS

The present invention will be described in detail with reference to FIGS. 6 through 31.

Figure 6:
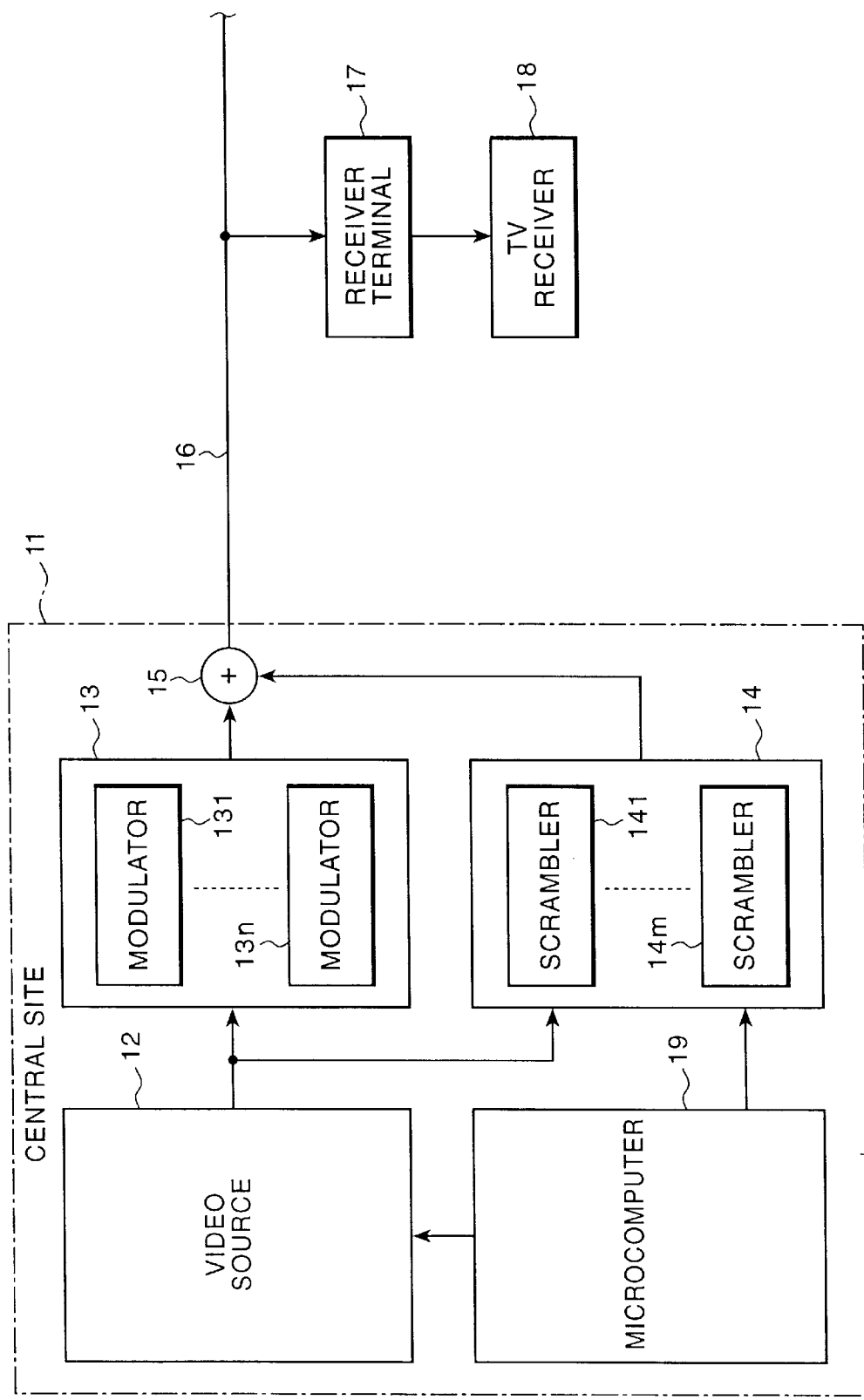
FIG. 6 is a block diagram showing the outline of the CATV broadcast system which is one embodiment of the scrambled broadcast systems according to the present invention.

FIG. 6 shows an outline of the CATV broadcast system which will be explained in the embodiment. That is, in FIG. 6, 11 denotes a central site provided with a video source 12 for generating several television signals.

Each television signal output from the video source 12 is applied to a modulator 13 so as to execute modulating processings in several modulators 13-1 through 13-n. The television signal is further applied to the scrambler 14 so as to execute the scrambling processings in several scramblers 14-1 through 14-m.

The outputs of the modulator 13 and the scrambler 14 are multiplexed together in a multiplexer 15 and transmitted to a network. As the network, many receiver terminals 17 are connected to multi-points on many transmission channels 16 (single channel is typically shown). And, the video source 12 and the scrambler 14 are controlled by a microcomputer 19 in the central site 11.

Furthermore, the microcomputer 19 generates control information to be transmitted to the network, and forwards it to the scrambler 14. Therefore, the scrambled control information is multiplexed to the television signal output from the modulator 13 or to the scrambled television signal output from the scrambler 14, and it can be transmitted to the receiver terminal 17.

Figure 7A:
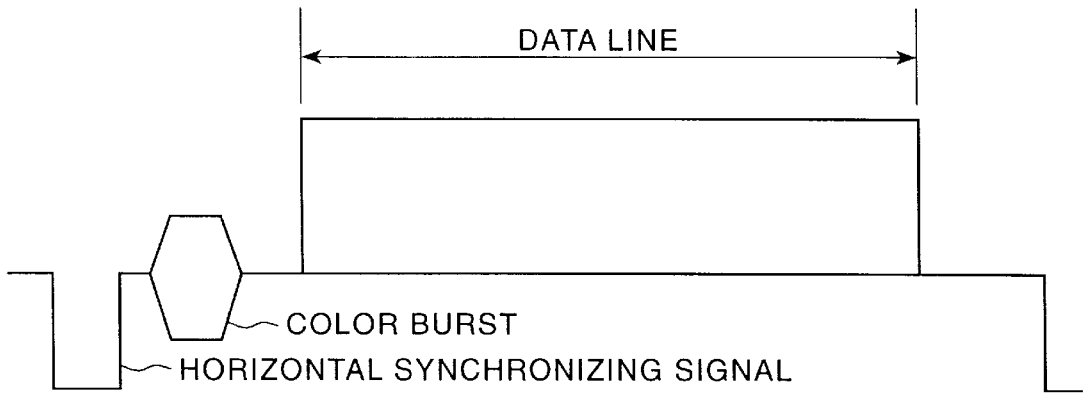
FIG. 7 is a diagram for explaining the control information in the embodiment of FIG. 6.
Figure 7B:
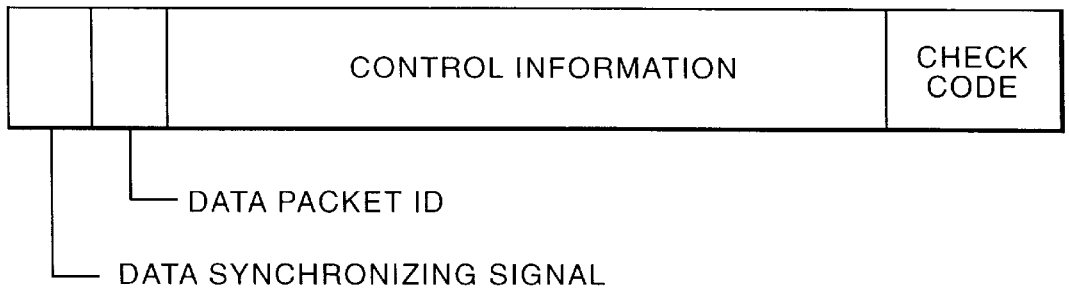
Figure 7C:
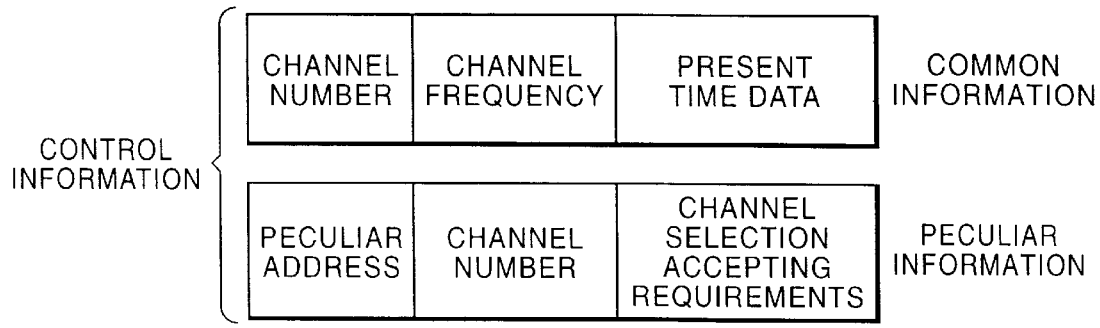

Here, the control information output from the microcomputer 19 is multiplexed to the television signal in the vertical retrace interval as a data line, as shown in FIG. 7a. The control information is comprised of a data synchronizing signal, a data packet identification data (ID), a control data and a check code, as shown in FIG. 7b. Furthermore as shown in FIG. 7c, the contents of the control information include a channel number, a channel frequency and a present time which designated as a common information, and a peculiar address, channel number or channel selection accepting requirements as a peculiar information.

FIG. 8 shows the detail of the receiver terminal 7. That is, in FIG. 8, 20 denotes an input terminal to which the television signal emitted from the central site 11 is applied. The television signal applied to the input terminal 20 is provided to a tuner 21 which selects the channel based on an instruction from a channel selector 22, then it is applied to an audio demodulator 23 and a video demodulator 24.

The audio demodulator 23 demodulates the audio components in the input television signal and forwards it to an RF (Radio Frequency) modulator 25. The video demodulator 24 demodulates the video components in the input television signal and forwards it to a control information extractor 26 and a video descrambler 27.

In this case, the control information extractor 26 extracts the control information from the input video signal and forwards it to a microcomputer 28. The microcomputer 28 decodes the input control information and, based on the decoded result, controls the video descrambler 27. Therefore, the video descrambler 27 executes the descrambling of the input video signal based on the instruction from the microcomputer 28, and forwards it to the RF modulator 25. The RF modulator 25 combines the audio signal output from the audio demodulator 23 and the video signal output from the video modulator 24, and forwards the composite signal to the television receiver 18 via an output terminal 29.

Here, to the microcomputer 28 operating information from a keyboard or a remote control section (not shown) can be provided via an input circuit 30. If the subscriber initiates the channel selection, the operating information is analyzed and applied to the channel selector 22. Accordingly, the channel selector 22 controls the tuner 21 to select the specified channel. Further, the microcomputer 28 is connected to a display 31 so as to display the operating information or the operating state of the receiver terminal 17.

Here, the scrambling and descrambling in the embodiment will be explained. In this scrambling the message data to be transmitted takes the first and the second redundancy adding processing and the encrypting processing which is comprised of the first and the second operation processings. For instance, when the message data is "83", it is subjected to the redundancy adding processing by adding the first redundancy data (for instance "3") generated in the pseudo random number generator (not shown) so as to generate the first redundancy added data "833".

The second redundancy data is added to the first redundancy added data "833" so as to generate a four digits data. The second redundancy data is selected with a condition that when all four digits of the data containing the second redundancy data are added the least significant bit (LSB) must be zero. In this case, since the first redundancy added data is "833", a digit "6" is selected for the second redundancy data so as to generate the second redundancy data "8336".

Then by adding 1 to each digit of the second redundancy added data "8336",

8+1=9

3+1=4

3+1=4

6+1=7 the first operation processing for generating a data "9447" is executed.

And, from the original data "9447" after the first operation processing each digit is converted into the binary numbers shown as the bits "3" (MSB) through "0" (LSB) in the table, of FIG. 9, and then these are also converted into hexadecimal numbers by reading out the bits "3" (MSB) through "0" (LSB) laterally in the table (see FIG. 9) and then reading out the hexadecimal numbers starting from the bottom "9" to the top "8" vertically in the table. Thus, the second operation processing for producing an encrypted data "9178" is executed. Therefor, the message data "83" is scrambled to the data "9178".

And in the descrambling, by executing the same operations as the second adding processing and the first adding processing to the received data in the reverse order to those as mentioned above, the second redundancy added data "8336" is reproduced, and the correctness of the first to second MSB (most significant bit) data "83" is verified by determining whether addition of the four digits produced a zero as the LSB.

FIG. 10 is a flow chart showing the operation of the central site 11 which executes the scrambling of the control information. First, the microcomputer 19 generates the common information and the peculiar information to be multiplexed to the broadcast television signal in the step S1, generates control information by controlling the transmission for uniting two types of information in the step S2 and forwards the united information to the scrambler 14.

The scrambler 14 generates the first redundancy added data produced by adding the first redundancy data to the control information in the pseudo random number generator in the step S3, and generates the second redundancy added data by adding the second redundancy data which meet the above condition to the first redundancy added data in the step S4.

Then, the scrambler 14 executes the encrypting processing which is comprised of the first operation processing and the second operation processing to the general second redundancy added data in the step S5, multiplexes it to the television signal to be transmitted in the step S6, and transmits it in the step S7.

FIG. 11 is a flow chart showing the operation of the receiver terminal 17 when the scrambled control information is received. First, when control information is received in the step S8, the microcomputer 28 decodes the received control information by executing the decrypting of the received control information in the step S9. Then, the microcomputer 28 determines the correctness of the decrypted control information in the step S10.

When the control information is determined to be correct (YES) the microcomputer 28 executes the data processing based on the control information in the step S11 and goes to the next processing stage in the step S12. When the control information is not correct information (NO) in the step S10, the microcomputer 28 goes to the processing in the step S12.

So, according to the arrangement of the embodiment, since the first redundancy data to be added to the message data is generated in the pseudo random number generator even if the message data are same the results of the scrambling are different each time. It is therefore possible to make decrypting by unauthorized users very difficult.

FIG. 12 is a flow chart showing another operation of the scrambling in the central site 11. First, the microcomputer 19 generates the common information and the peculiar information to be multiplexed to the broadcast television signal in the step S13, generates the control information by controlling the transmission to unite them in the step S14, and forwards it to the scrambler 14.

Then, the scrambler 14 generates the first redundancy added data by adding the first redundancy data to the control information based on the present time in the step S15 and generates the second redundancy added data by adding the second redundancy data which meets the above condition to the first redundancy added data in the step S16.

Then, the scrambler 14 executes the encrypting processing which is comprised of the first and the second operation processings to the generated second redundancy added data in the step S17, multiplexes it to the television signal to be transmitted in the step S18, and transmits it in the step S19.

FIG. 13 is a flow chart showing the operation of the receiver terminal 17 when the scrambled control information is received. First, when control information is received in the step S20, the microcomputer 28 decodes the control information by executing the decrypting on the received control information in the step S21. Then, the microcomputer 28 determines the correctness of the decrypted first redundancy data contained in the control information in the step S22. The determination of the correctness of the first redundancy data is executed by determining whether the first redundancy data corresponds to the time of the timer (not shown) which is built-in the receiver terminal 17 or not.

When the first redundancy data is determined to be correct (YES), the microcomputer determines the correctness of the control information in the step S23. If the control information is determined to be correct (YES) the microcomputer 28 executes the data processing based on the control information in the step S24 and goes to the next processing stage in the step S25. When the first redundancy data is not correct (NO) in the step S22 or the control information is node correct (NO) in the step S10 the microcomputer 28 goes to the processing in the step S25.

So, according to the arrangement of the second embodiment, since the first redundancy data is generated based on the present time, even if the message data are the same the results of the scrambling are different each time. It therefore is also possible to make decrypting by an unauthorized user very difficult. Furthermore, since the correctness of the control information can be determined after the determination of the correctness of the first redundancy data generated based on the present time it will be easy to find the tampering all the more.

Figure 14:
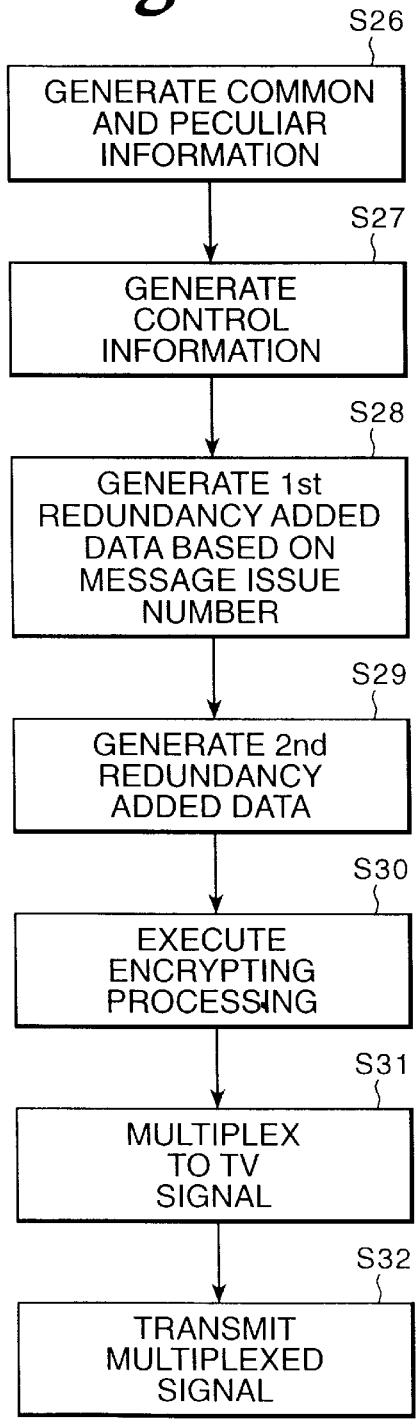
FIG. 14 is a flow chart for explaining still another operation of the embodiment of FIG. 6.

FIG. 14 is a flow chart showing still another operation of the scrambling in the central site 11. First, the microcomputer 19 generates the common information and the peculiar information to be multiplexed to the broadcast television signal in the step S26, generates the control information by controlling the transmission to unite them in the step S27, and forwards it to the scrambler 14.

Then, the scrambler 14 generates the first redundancy added data by adding the first redundancy data to the control information based on the message issue number in the step S28 based on the microcomputer 19 and generates the second redundancy added data by adding the second redundancy data which meets the above condition to the first redundancy added data in the step S29. The message issue number is a number which is incremented whenever the control information is transmitted from the central site 11.

Then, the scrambler 14 executes the encrypting processing which is comprised of the first and the second operation processings to the generated second redundancy added data in the step S30, multiplexes it to the television signal to be transmitted in the step S31, and transmits it in the step S32.

Figure 15:
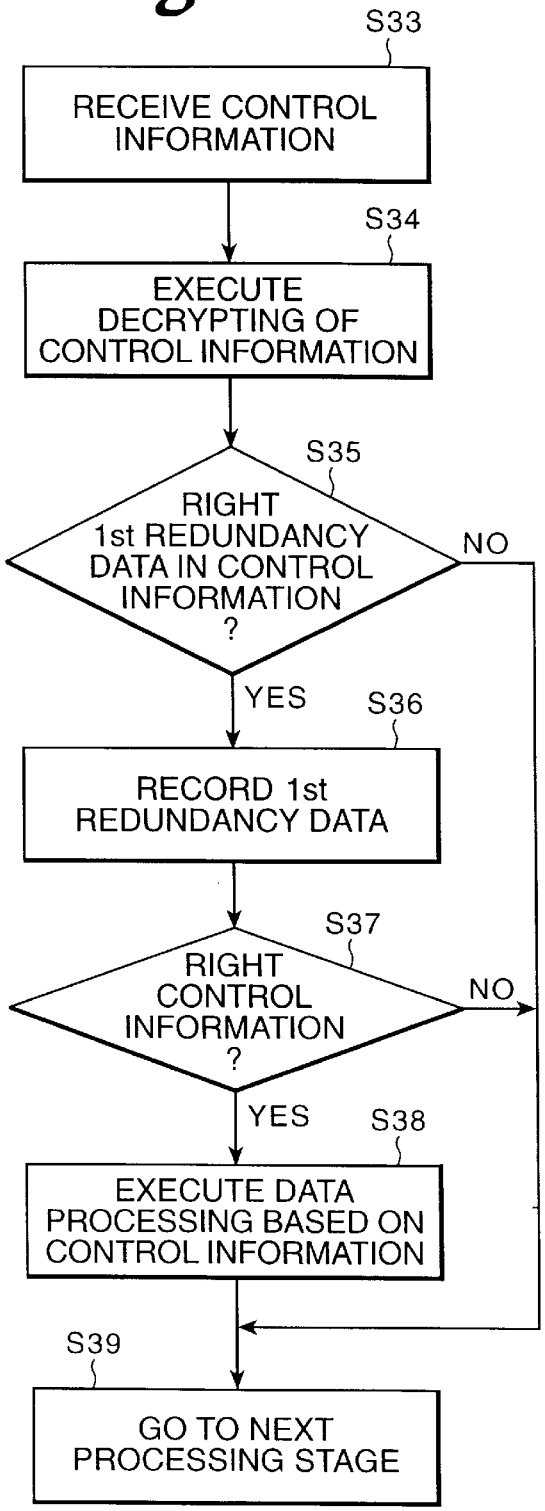
FIG. 15 is a flow chart for explaining together with FIG. 14 the operation of the embodiment of FIG. 6.

FIG. 15 is a flow chart showing the operation of the receiver terminal 17 when the scrambled control information is received. First, when control information is received in the step S33, the microcomputer 28 decrypts it by executing the descrambling to the received control information in the step S34. Then, the microcomputer 28 determines the correctness of the first redundancy data contained in the decoded control information in the step S35. The correctness of the first redundancy data is determined if for instance the first redundancy data is not the same as the first redundancy data contained in the control information which is received before.

When the first redundancy data is determined to be right (YES), the microcomputer 28 records its message issue number to determine the rightness of the first redundancy data later in the step S36. Then, the microcomputer 28 determines the rightness of the control information in the step S37. If the control information is determined to be right (YES) the microcomputer 28 executes the data processing based on the control information in the step S38 arid goes to the next processing stage in the step S39. When the first redundancy data determined to be not right (NO) in the step S35 or the control information is determined to be not right (NO) in the step S37 the microcomputer 28 goes to the processing in the step S39.

So, according to the arrangement of the third embodiment, since the first redundancy data is generated based on the message issue number of the control information, even if the message data are same the results of the scrambling are different each time. So that, it is also possible to make the decrypting very difficult. Furthermore, since the rightness of the control information can be determined after the determination of the rightness of the first redundancy data generated based on the message issue number it will be easy to find the tampering all the more.

The above embodiments of the present invention can provide an extremely superior scrambled broadcast system which has different results of the scrambling even if the message data are same and prevents the message data from being decrypted without proper authorization.

Further embodiments of the present invention will be explained hereinafter referring to FIG. 6.

Figure 16:
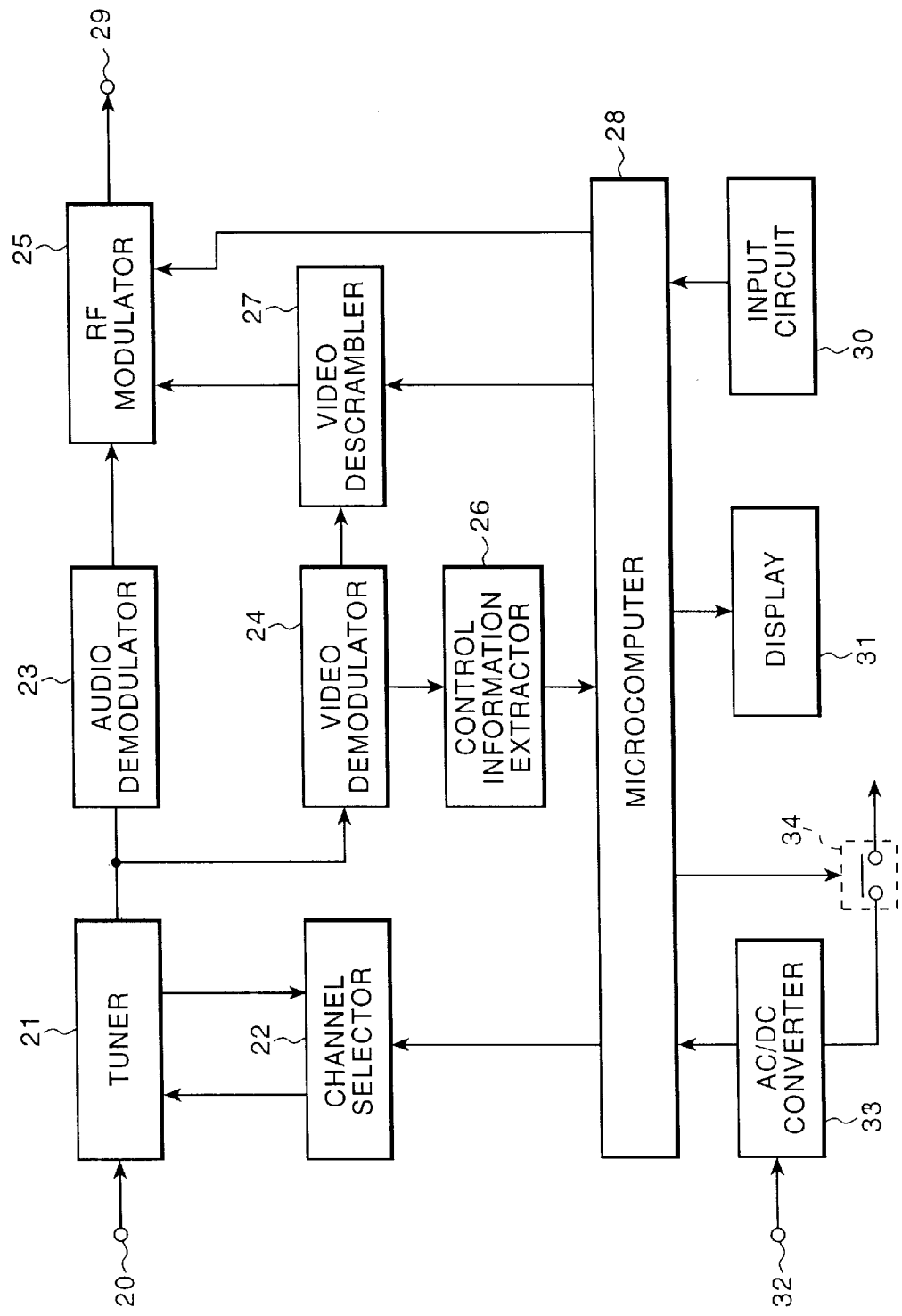
FIG. 16 is a block diagram showing the detail of the receiver terminal 17 in the embodiment of FIG. 6.

In FIG. 16, each television signal output from the video source 12 is applied to a modulator 13 so as to execute the modulating processings in several modulators 13-1 through 13-n. The television signal is further applied to the scrambler 14 so as to execute scrambling processings in several scramblers 14-1 through 14-m.

The output of the modulator 13 and that of the scrambler 14 are multiplexed in a multiplexer 15 and transmitted to a network. As this network, many receiver terminals 17 are connected to multi-points on many transmission channels 16 (only one line is drawn). And, the video source 12 and the scrambler 14 are controlled by a microcomputer 19 in the central site 11.

Furthermore, the microcomputer 19 generates control information to be transmitted to the network, and forwards it to the scrambler 14. Therefore, the scrambled control information is multiplexed to the television signal output from the modulator 13 or to the scrambled television signal output from the scrambler 14, and it becomes possible to transmit the scrambled control information to the receiver terminal 17.

FIG. 16 shows the detail of the receiver terminal 17. That is, in FIG. 16, 20 denotes an input terminal to which the television signal transmitted from the central site 11 is applied. The television signal applied to the input terminal 20 is applied to a tuner 21 which selects the channel based on an instruction from a channel selector 22, then it is applied to an audio demodulator 23 and a video demodulator 24.

The audio demodulator 23 demodulates the audio component in the input television signal and forwards it to an RF (Radio Frequency) modulator 25. The video demodulator 24 demodulates the video component in the input television signal and forwards it to a control information extractor 26 and a video descrambler 27.

In this case, the control information extractor 26 extracts the control information from the input video signal and forwards it to a microcomputer 28. The microcomputer 28 decodes the input control information and based on the decoded result it controls the video descrambler 27. Therefore, the video descrambler 27 executes the descrambling to the input video signal based on the instruction of the microcomputer 28, and forwards it to the RF modulator 25.

The RF modulator 25 combines the audio signal output from the audio demodulator 23 and the video signal output from the video demodulator 24 and forwards it to the television receiver 18 via the output terminal 29. Further, the RF modulator 25 has a function for outputting the composite signal of the audio and video signals to the output terminal 29, that is for cutting off the output to the television receiver 18 based on the instruction from the microcomputer 28.

Here, operating information from a keyboard or a remote control section (not shown) is applied to the microcomputer 28 via an input circuit 30. So, if the subscriber operates the channel selection, the operating information is analyzed and applied to the channel selector 22. Accordingly, the channel selector 22 controls the tuner 21 to select a specific channel.

Further, the microcomputer 28 is connected to a display 31 so as to display the operating information or the operating state of the receiver terminal 17 on the display 31.

In FIG. 16, 32 denotes an AC input terminal to which external AC utility power is supplied. The AC utility power on the AC input terminal 32 is supplied to an AC/DC converter 33 and converted to a predetermined DC voltage, then it is supplied to the microcomputer 28 as a power voltage. The DC voltage output from the AC/DC converter 33 is supplied to the internal circuits of the tuner, the channel selector 22, the audio demodulator 23, the video demodulator 24, the RF modulator 25, the control information extractor 26, the video descrambler 27, the input circuit 30 and the display 31 as the power voltages via the power switch 34 which is controlled ON and OFF by the microcomputer 28.

Figure 17:
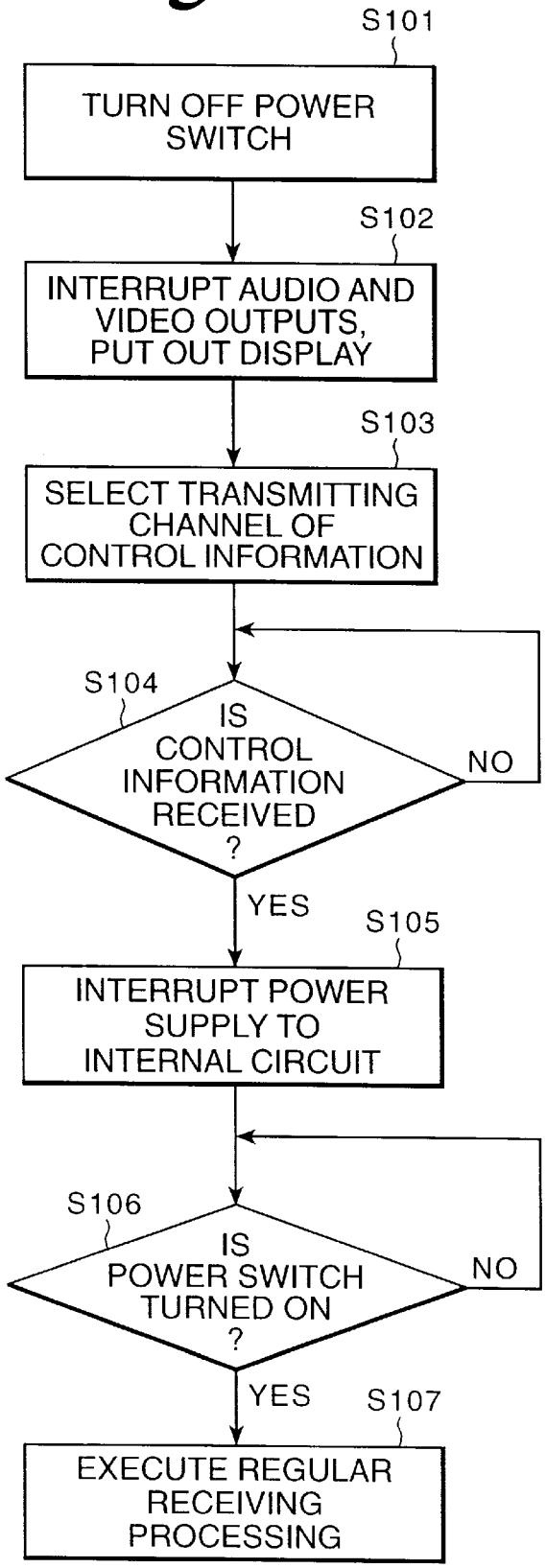
FIG. 17 is a flow chart for explaining another operation of the embodiment of FIG. 16.

In the above arrangement, the operation will be explained with reference to the flow chart shown in FIG. 17. First, when a power switch (not shown) of the receiver terminal 17 is turned OFF by the subscriber in the step S101, the microcomputer 28 insulates the RF modulator 25 so that the composite signal of the audio and the video signals is not applied to the television receiver 18 and puts out the display on the display 31 in the step S102.

Thereafter, the microcomputer 28 controls the selecting channel circuit 22 so as to select a channel for transmitting the control information in the step S103. The microcomputer 28 then waits to receive the control information in the step S104. The microcomputer 28 then turns OFF the power switch 34 to interrupt the power supply, to the internal circuit in the step S105. When the microcomputer 28 discriminates that the power switch 34 is turned ON (YES) in step S106, it executes the regular receiving processing in the step S107.

So, according to the above arrangement, when the power switch is turned OFF the channel where the control information is transmitted becomes the receiving state. After the control information is received in that state the power source supply to the internal circuit except the microcomputer are interrupted. As a result, it is possible to surely receive the control information without high electric power consumption and the generation of heat.

Figure 18:
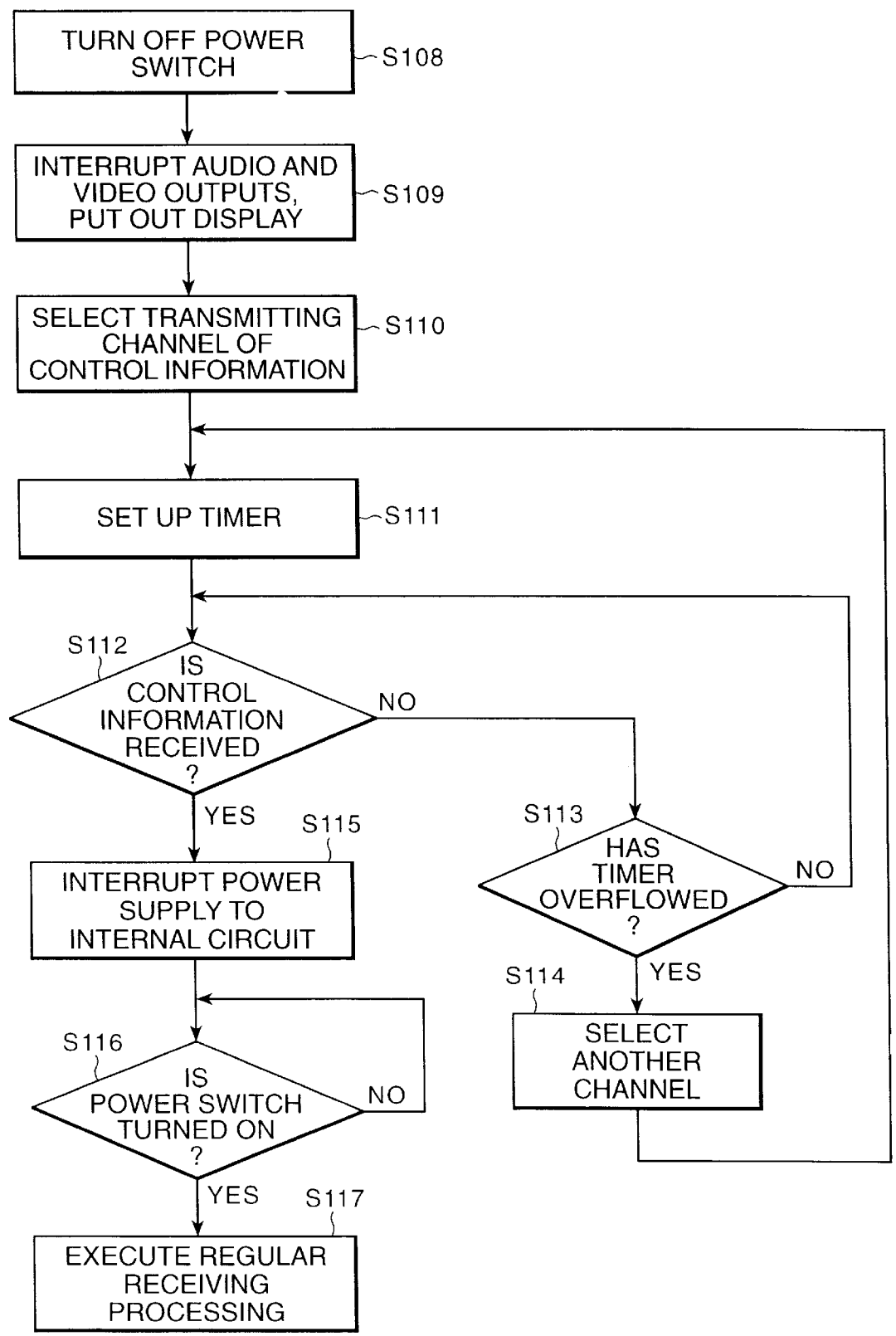
FIG. 18 is a flow chart for explaining still another operation of the embodiment of FIG. 16.

FIG. 18 is a flow chart for explaining another operation of the embodiment shown in FIG. 16. First, when a power switch (not shown) of the receiver terminal 17 is turned OFF by the subscriber in the step S108, the microcomputer 28 insulates the RF modulator 25 so that the composite signal of the audio and the video signals is not applied to the television receiver 18 and puts out the display on the display 31 in the step S109.

Then, the microcomputer 283 controls the channel selector 22 to select the channel where the control information is transmitted in the step S110, and counts the time by setting a built-in timer (not shown) in the step S111. Then the microcomputer 28 discriminates whether the control information has been received or not in the step S112. When it determines that the control information has not been received (NO) it discriminates whether the timer has counted a predetermined time or not, that is whether the timer has achieved overflow or not in the step S113.

Here, when it determines that the timer is not overflowed (NO) the microcomputer 28 returns to the operation in step S112. When it determines that the timer has overflowed (YES), that is when the control information is not obtained in the channel which is presently selected, the microcomputer controls the channel selector 22 to select another channel in the step S114 and returns to the operation in the step S111.

On the other hand, when it determines that the control information has been received (YES) in the step S112 the microcomputer 28 turns the power switch 34 OFF so as to interrupt the power supply to the internal circuits in the step S115. Then, the microcomputer 28 discriminates whether the power switch has been turned ON or OFF in the step S116. When microcomputer 28 determines that the power switch has turned ON (YES), it executes the normal receiving operation in the step S117.

According to the above operation, when the power switch is turned OFF the channel where the control information is transmitted becomes the receiving state. When the control information is not received over a predetermined time in that state, since another channel is selected it is possible to surely receive the control information.

Figure 19:
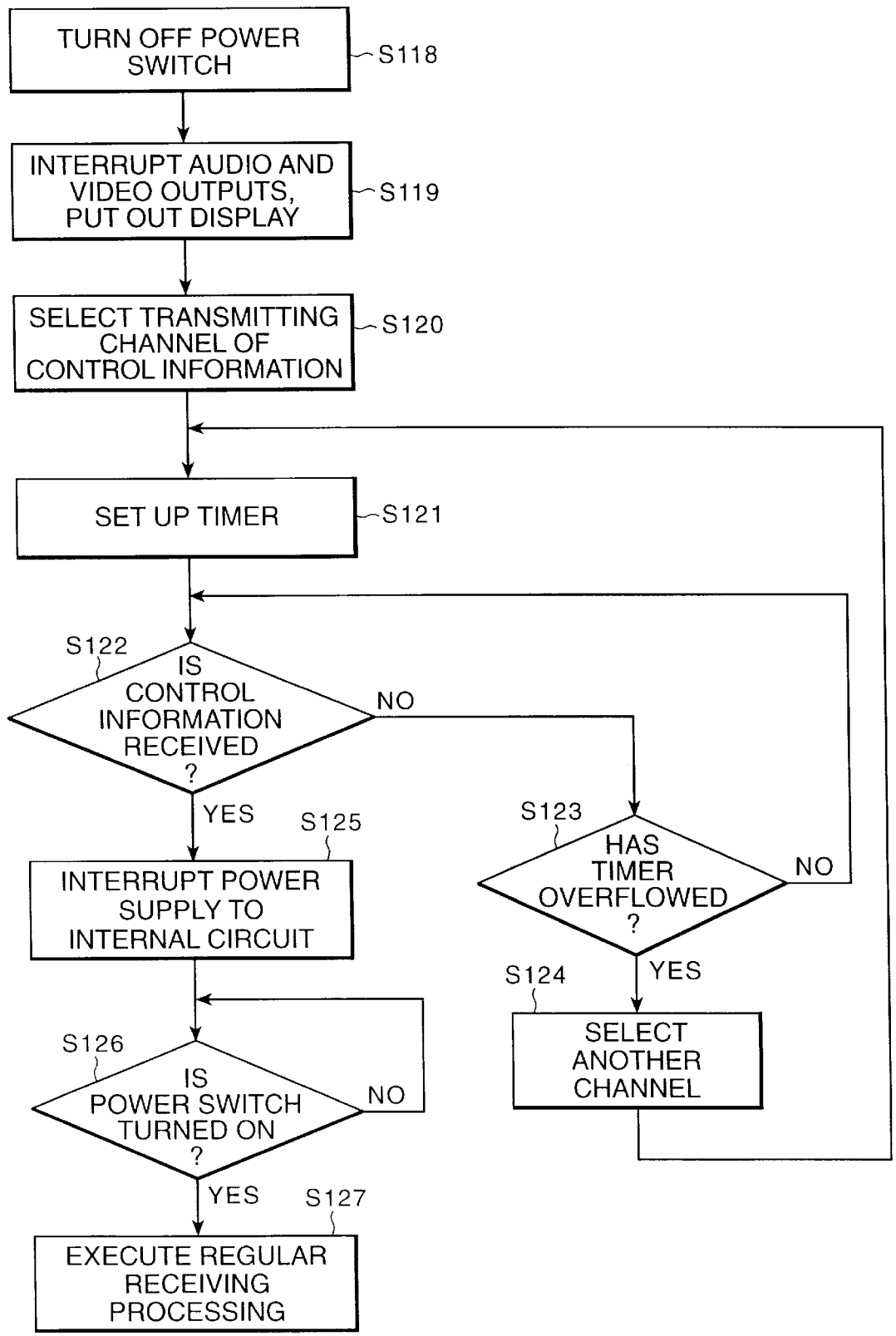
FIG. 19 is a flow chart for explaining still another operation of the embodiment of FIG. 16.

FIG. 19 is a flow chart for explaining still another operation of the embodiment shown in FIG. 16. First, when a power switch (not shown) of the receiver terminal 17 is turned OFF by the subscriber in the step S118, the microcomputer 28 insulates the RF modulator 25 so that the composite signal of the audio and the video signals is not supplied to the television receiver 18 and puts out the display on the display 31 in the step S119.

Then, the microcomputer 28 controls the channel selector 22 to select the channel where the control information is transmitted in the step S120, and counts the time by setting a built-in timer (not shown) in the step S121. Then the microcomputer 28 discriminates whether the control information has been received or not in the step S122. When it determines that the control information has not been received (NO) it discriminates whether the timer has counted a predetermined time or not, that is whether the timer has achieved overflow or not in the step S123.

When it determines that the timer has not overflowed (NO) the microcomputer 28 returns to the operation in step S122. When it determines that the timer is overflowed (YES), that is when the control information is not obtained in the channel which is presently selected, the microcomputer 28 controls the channel selector 22 to select another channel in the step S124 and returns to the operation in the step S121.

On the other hand, when it determines that the control information has been received (YES) in the step S122 the microcomputer 28 turns the power switch 34 OFF so as to interrupt the power supply to the internal circuit in the step S125. Then, the microcomputer 28 discriminates whether the power switch has been turned ON or OFF in the step S126. When it determines that the power switch has turned ON (YES), it executes the normal receiving operation in the step S127.

According to the above operation, when the power switch is turned OFF the channel where the control information is transmitted becomes the receiving state. When the control information is not received over a predetermined time in that stale, since another channel is selected based on a preset order it is possible to surely receive the control information.

Figure 20:
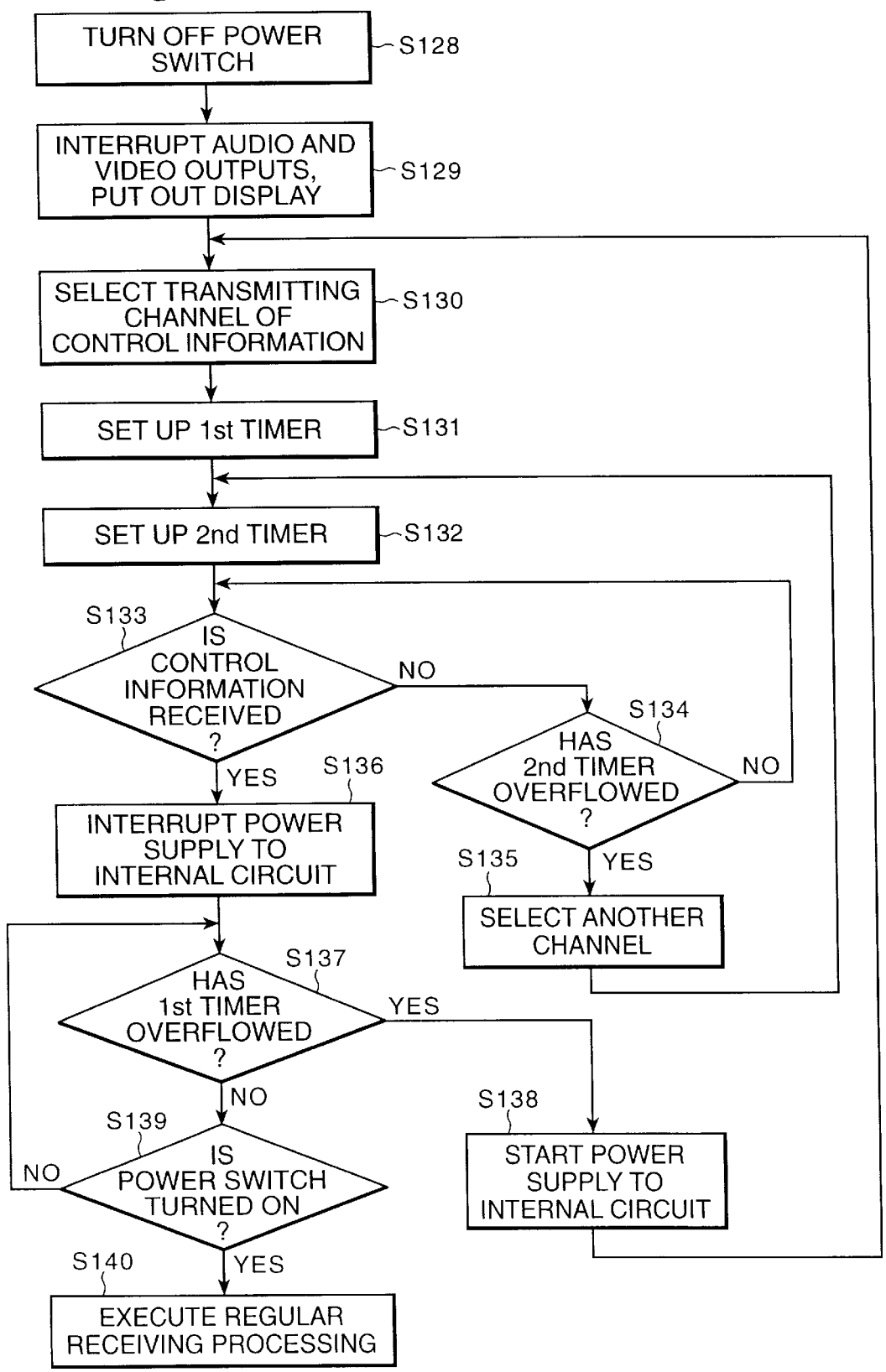
FIG. 20 is a flow chart for explaining still another operation of the embodiment of FIG. 16.

FIG. 20 is a flow chart for explaining still another operation of the embodiment shown in FIG. 16. First, when a power switch (not shown) of the receiver terminal 17 is turned OFF by the subscriber in the step S 128, the microcomputer 28 insulates the RF modulator 25 so that the composite signal of the audio and the video signals is not applied to the television receiver 18 and puts out the display on the display 31 in the step S129.

Then, the microcomputer 28 controls the channel selector 22 to select the channel where the control information is transmitted in the step S130, and counts the time by setting a first built-in timer (not shown) in the step S131, and then continuously, counts the time by setting a built-in second timer (not shown) in the step S132.

Then the microcomputer 28 discriminates whether the control information has been received or not in the step S133. When it determines that the control information has not been received (NO) it discriminates whether the second timer has counted a predetermined time or not, that is whether the timer has achieved overflow or not in the step S134.

Here, when it determines that the second timer is not overflowed (NO) the microcomputer 28 returns to the operation in step S133. When it determines that the second timer overflowed (YES), that is when the control information is not obtained in the channel which is presently selected, the microcomputer 28 controls the channel selector 22 to select another channel in the step S135 and returns to the operation in the step S132.

On the other hand, when it determines that the control information has been received (YES) in the step S133 the microcomputer 28 turns the power switch 34 OFF so as to interrupt the power supply to the internal circuit in the step S136. Then, the microcomputer 28 discriminates whether the first timer has counted the predetermined time or not, that is, whether the first timer has exceeded its setup time or not in the step S137. When the microcomputer 28 determines that the first timer has exceeded its setup time (YES), it turns the power switch 34 ON so as to start the power supply to the internal circuit in the step S138, and returns to the operation in the step S130.

When it determines that tie first timer has not overflowed (NO) in the step S137 the microcomputer 28 discriminates whether the power switch has been turned ON in the step S139. When it determines that the power switch has been turned ON (YES) it carries the normal receiving operation in the step S140.

According to the above operation, since the first timer counts a predetermined time in the state that the power switch is turned OFF, the control information is received and the power voltage is supplied to the internal circuit, the power voltage is again automatically supplied to the internal circuit after a predetermined time passed and it becomes the state that it receives the control information, so that it can cope with renewal of the control information every fixed period of time.

Figure 21:
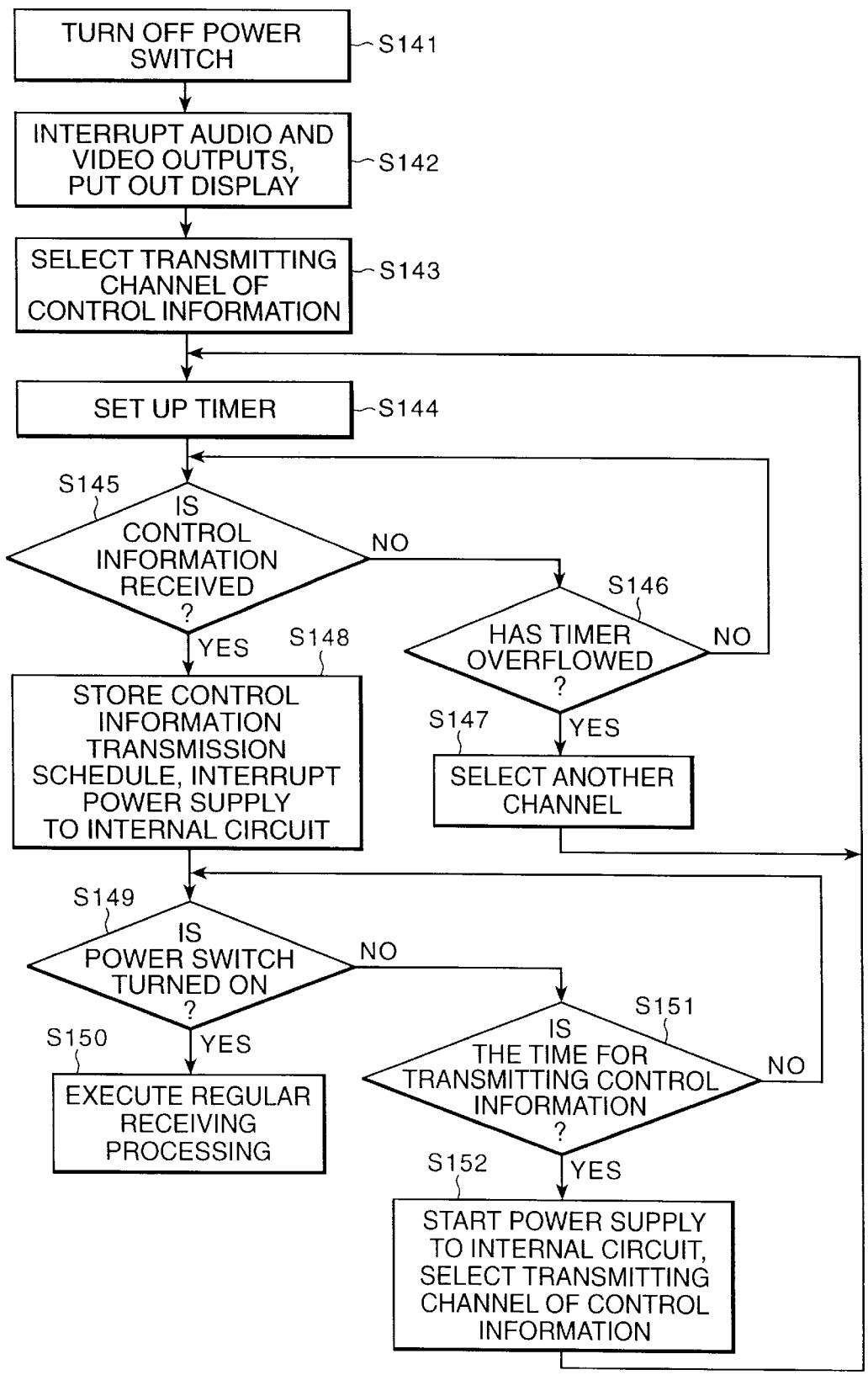
FIG. 21 is a flow chart for explaining still another operation of the embodiment of FIG. 16.

FIG. 21 is a flow chart for explaining still another operation of the embodiment shown in FIG. 16. In the operation, data showing the control information transmission schedule to which the time when the control information hereafter is transmitted is written is contained in the control information transmitted from the central site 11.

First, when a power switch (not shown) of the receiver terminal 17 is turned OFF by the subscriber in the step S141, the microcomputer 28 insulates the RF modulator 25 so that the composite signal of the audio and the video signals is not applied to the television receiver 18 and puts out the display on the display 31 in the step S142.

Then, the microcomputer 28 controls the channel selector 22 to select the channel where the control information is transmitted in the step S143, and counts the time by setting a built-in timer (not shown) in the step S144. Then the microcomputer 28 discriminates whether the control information has been received or not in the step S145. When it determines that the control information has not been received (NO) it discriminates whether the timer has counted a predetermined time or not, that is whether the timer has achieved overflow or not in the step S146.

Here, if it determines that the timer has not overflowed (NO), the microcomputer 28 returns to the processing in the step S145. If it then determines that the timer has overflowed (YES), that is that, the control information is not obtained within a predetermined time at a channel which is presently selected, the microcomputer 28 controls the channel selector 22 to select another channel in the step S147 and returns to the processing in the step S 144.

On the other hand, if it determines that the control information is received (YES) in the step S145, the microcomputer 28 stores the control information transmission schedule contained in the received control information in the built-in memory (not shown) in the step S148 and turns the power switch 34 OFF to interrupt the power supply to the internal circuit.

Then, the microcomputer 28 discriminates whether the power switch has been turned ON or not in the step S149. When it determines that the power switch has been turned On (YES) it carries the normal receiving processing in the step S150. When it determines that the power switch has not been turned ON (NO) in the step S149, the microcomputer 28 looks at the control information transmission schedule which we previously recorded in the memory, then discriminates whether it is time for transmitting the next control information or not in the step S151.

Then, when it determines that it is not the time for transmitting the next control information (NO), the microcomputer 28 returns to the operation in the step S149. When it determines that it is time for transmitting the next control information (YES), the microcomputer 28 turns the power switch 34 ON, starts the power supply to the internal circuit, controls the channel selector 22 to select the channel where the next control information is transmitted in the step S152 and returns to the operation in the step S144.

Here, the control information transmission schedule is stored by the microcomputer 28 based on the flow chart shown in FIG. 22. That is, when the microcomputer 28 receives the control information in the step S153 it discriminates whether the control information transmission schedule is contained in the received control information or not in the step S154. When it determines that the control transmission schedule is contained in the control information (YES) it stores the control information transmission schedule in the memory in the step S155, and it goes to the operation except (other than) the receiving of the control information in the step S156.

According to the above operation, when data which shows the control information transmission schedule indicating the time when the control information hereafter is transmitted is contained in the control information, it takes out the control information transmission schedule from the received control information and stores it in the memory, then it looks up the memory and returns to the state that it receives the control information since the power voltage is automatically supplied to the internal circuit when the control information is transmitted. It therefore is possible to securely receive the control information.

Figure 23:
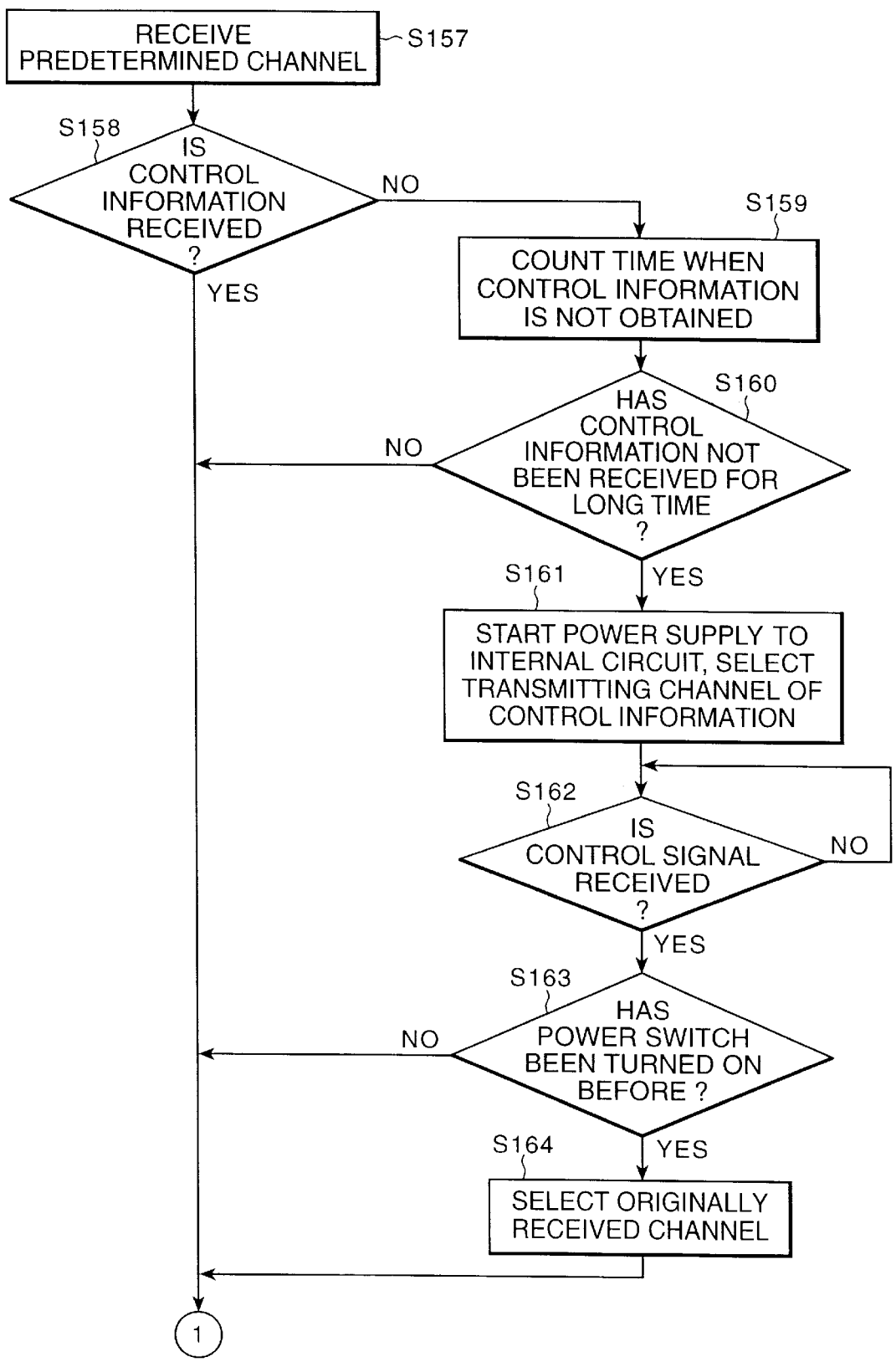
FIG. 23 is a flow chart for explaining still another operation of the embodiment of FIG. 16.
Figure 24:
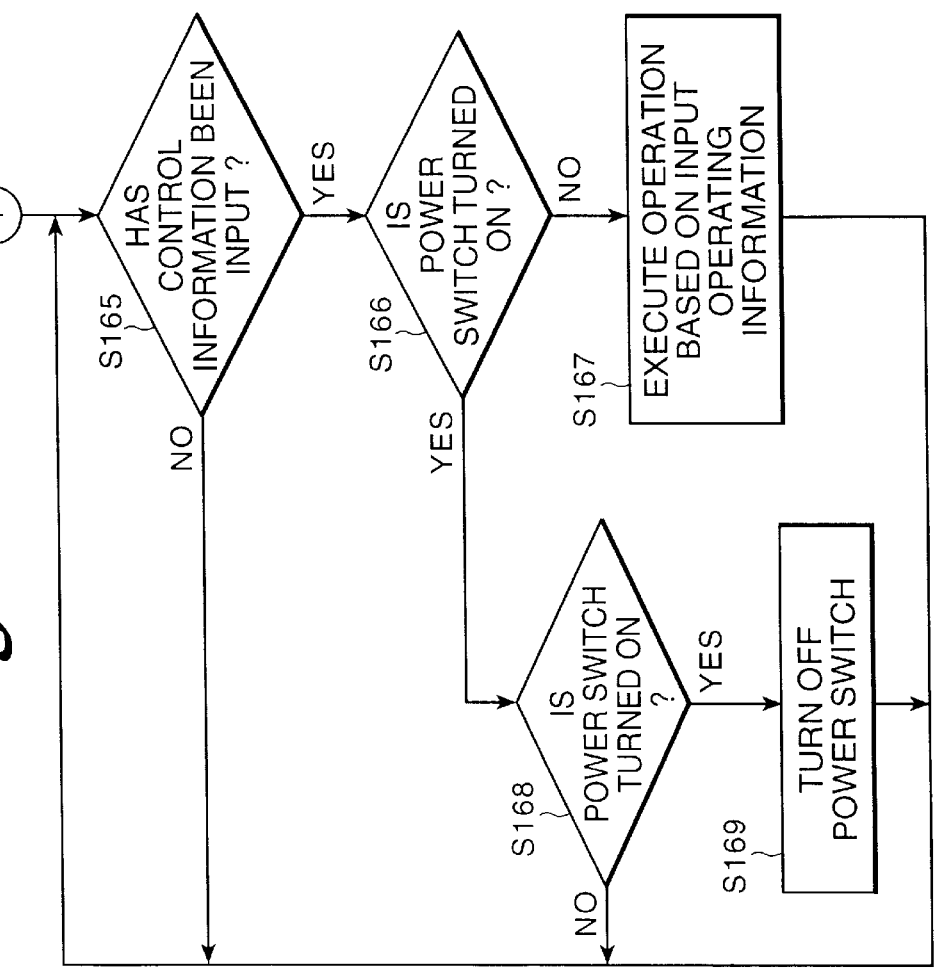
FIG. 24 is a flow chart for explaining still another operation of the embodiment of FIG. 16.

FIGS. 23 and 24 are flow charts for explaining still other operations of the embodiment shown in FIG. 16. First, in the state that the receiver terminal 17 receives a predetermined channel (step S157) the microcomputer 28 discriminates whether the control information has been obtained from the received channel or not in the step S158. When it determines that the control information has not been obtained (NO) it operates the built-in timer and counts the time when the control information is not obtained in the step S159.

Then, the microcomputer 28 discriminates whether the control information has not been received for a long time from the counted time in the step S160. When it determines that the control information has not been received for a long time (YES) it turns the power switch 34 ON, starts the power supply to the internal circuit and controls the channel selector 22 to select the channel where the control information is transmitted in the step S161. In this case, since the receiver terminal 17m has been receiving a predetermined channel in the step S157 the power switch 34 has already turned ON. Then the microcomputer forcefully changes the channel which had been received at the start to the channel in which the control information is transmitted.

Then the microcomputer 28 waits until the control information is received in the step S162 and discriminates whether the power switch has been turned ON or not before the channel is changed to the channel in which the control information has been transmitted in the step S163. When it determines that the switch has been turned ON (YES) it selects the channel which has been originally received at the start of the reception in the step S164.

When it determines that the control information is received (YES) in the step S158, the control information has not been received (NO) in the step S160, that the power switch has not turned ON (NO) in the step S163, or after the operation in the step) S164 the microcomputer 28 discriminates whether the operating information of the subscriber has been input or not via the input circuit 30 in the step S165.

When it determines that the operating information has been input (YES) the microcomputer 28 discriminates whether the power switch 34 has been turned ON or not in the step S166. When it determines that the power switch 34 has not turned ON (NO) it executes the processing based on the input operating information in the step S167 and returns to the operation in the step S165. When it determines that the power switch 34 has been turned ON (YES) in the step S166 the microcomputer 28 discriminates whether the power switch was turned ON or not in the step S168. When it determines that the power switch was turned ON (YES) the microcomputer turns the power switch 34 OFF and returns to the operation in the step S165.

According to the above operation, since the microcomputer 28 selects the channel in which the control information is forcefully transmitted when the control information has not been obtained for a long time even in the stage that the receiver terminal 17 receives a predetermined channel it is possible to avoid receiving the channel where the control information has not been obtained for a long time. That is, if it keeps receiving without renewing the control information the receiver terminal 17 often executes a wrong operation. To cope with the problem, the microcomputer forcefully selects the channel where the control information is transmitted when the control information has not been obtained for a long time.

Figure 25:
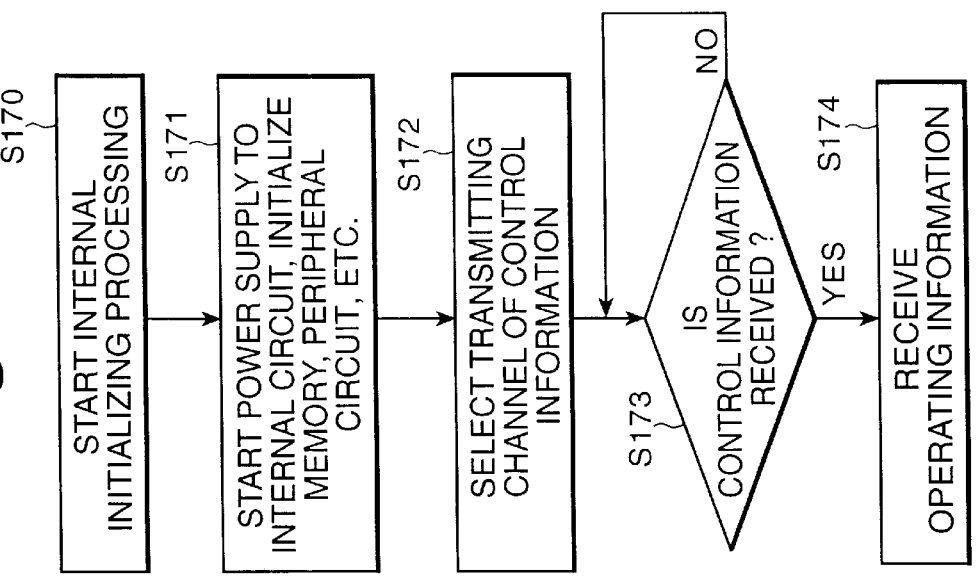
FIG. 25 is a flow chart for explaining still another operation of the embodiment of FIG. 16.

FIG. 25 is a flow chart for explaining still another operation of the embodiment shown in FIG. 16. In the operation, there is a countermeasure against a power failure. First, the microcomputer 28 detects the restoration after the power failure, starts the internal initializing processing (in the step S170), turns ON the power switch 34 so as to start the power supply to the internal circuit and executes the initializing processing to the built-in memory, peripheral circuits etc., in the step S171.

Then, the microcomputer 28 controls the channel selecting circuit 22 to select the channel where the control information is transmitted in the step S172, waits until the control information is received in the step S172 and receives the operating information from the subscriber in the step S174.

According to the above operation, since the microcomputer 28 receives the operating information from the subscriber after receiving the control information in the state the it detects the restoration after the power failure it is possible to prevent the wrong operation of the receiver terminal 17 by the renewing of the control information.

Figure 26:
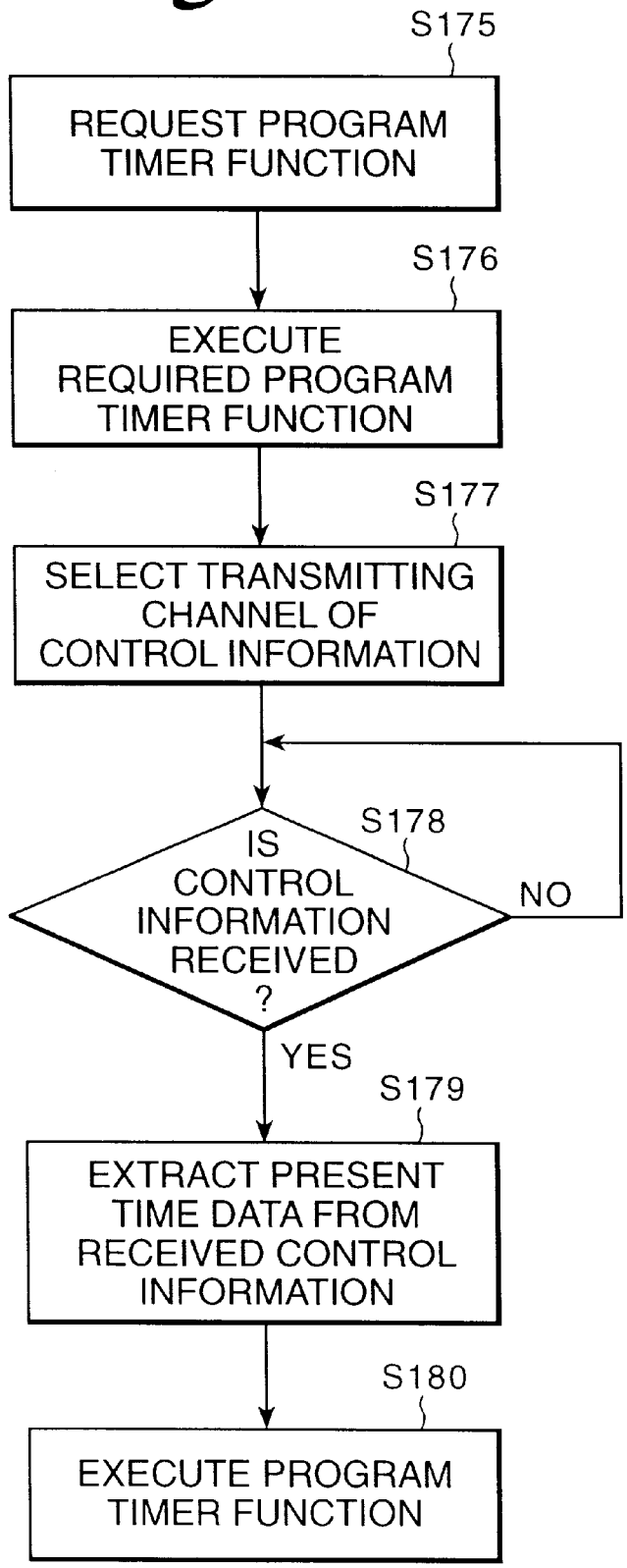
FIG. 26 is a flow chart for explaining still another operation of the embodiment of FIG. 16.

FIG. 26 is a flow chart for explaining still another operation of the embodiment shown in FIG. 16. In the operation, the receiver terminal 17 executes the program timer function by using the present time data contained in the control information.

First, if the subscriber inputs the operating information which requests the program timer function to the receiver terminal 17 in the step S175, the microcomputer 28 sets up the internal circuit so as to execute the requested program timer function in the step S176, controls the channel selector 22 to select a channel where the control information is transmitted, and discriminates whether the control information was received or not in the step S178.

When it determines that the control information was received (YES) the microcomputer 28 extracts the present time data from the received control information in the step S179 and executes the program timer function in the step S180.

According to the above operation, eighth embodiment, since the microcomputer 28 receives first the control information, and then obtains the present time contained in the received control information and executes the program timer function when the program timer function is requested for the receiver terminal 17, it is possible to execute an accurate program timer function.

The above embodiments of the present invention can provide the television signal receiving device which is able to receive a control information certainly without high power consumption and the generation of heat.

Still further embodiments of the present invention will be explained hereinafter referring to FIGS. 27 through 31.

Figure 2:
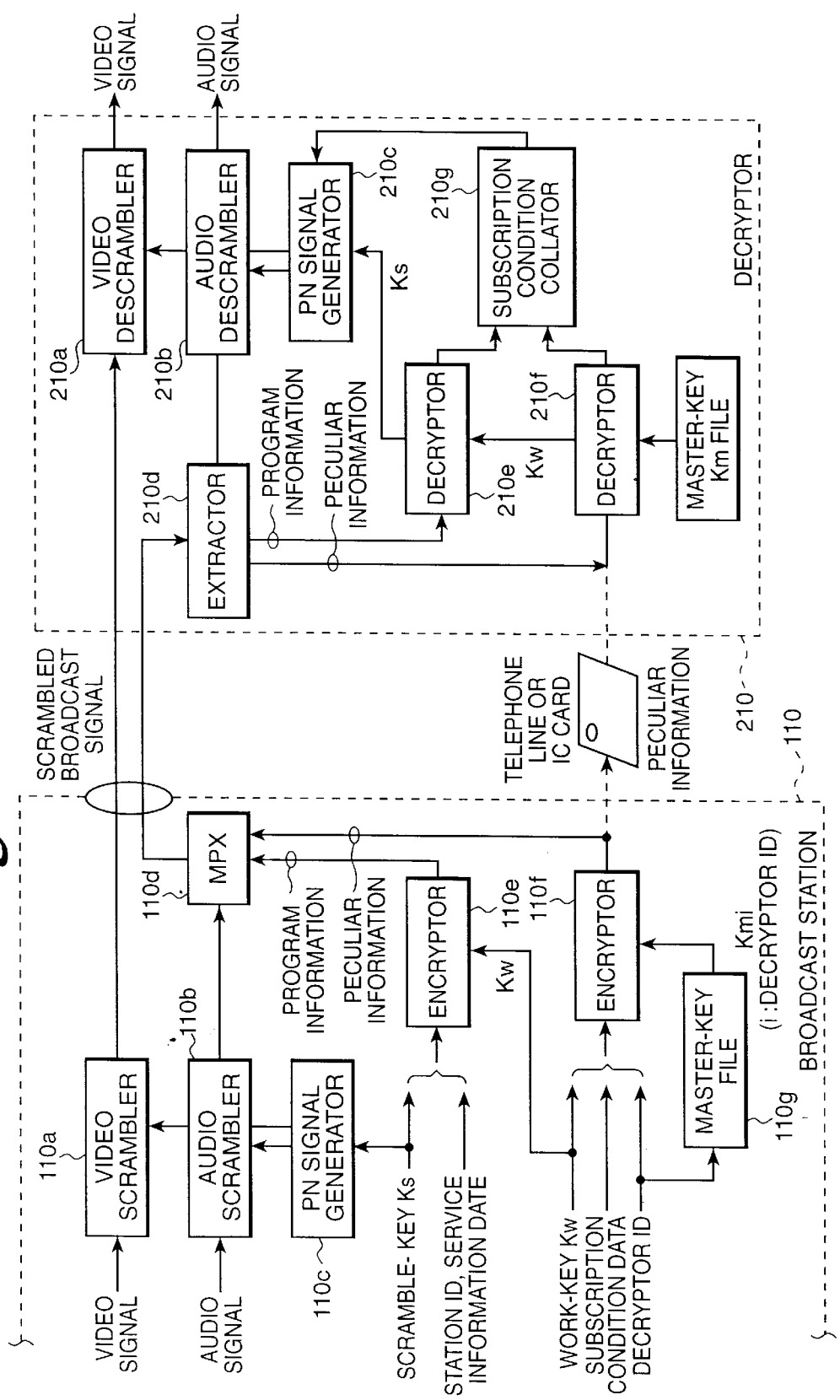
FIG. 2 is a block diagram showing the arrangement of the pay broadcast system applied to the present invention.
Figure 3:
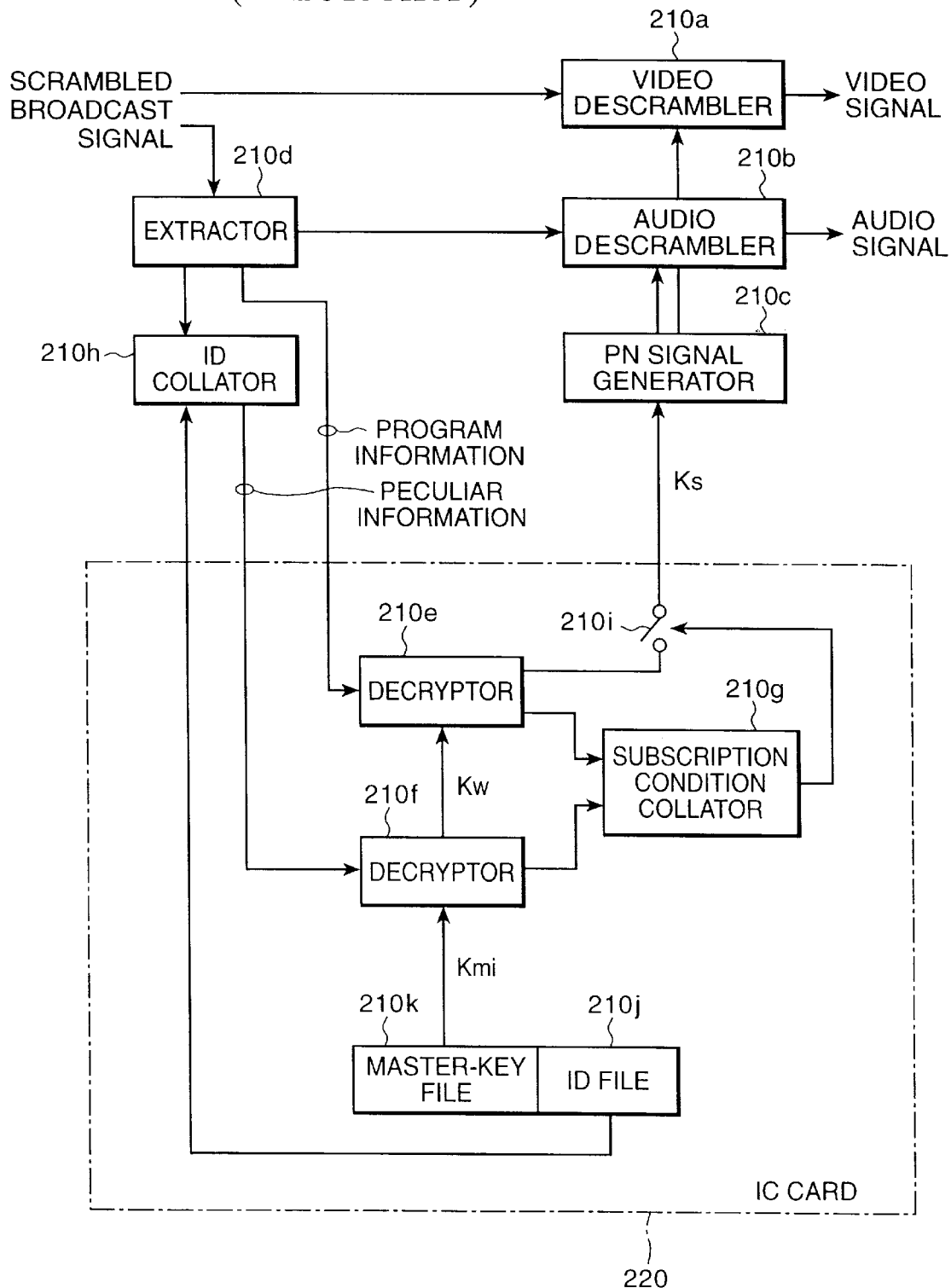
FIG. 3 is a block diagram showing the conventional scrambled broadcast system decryptor.
Figure 4:
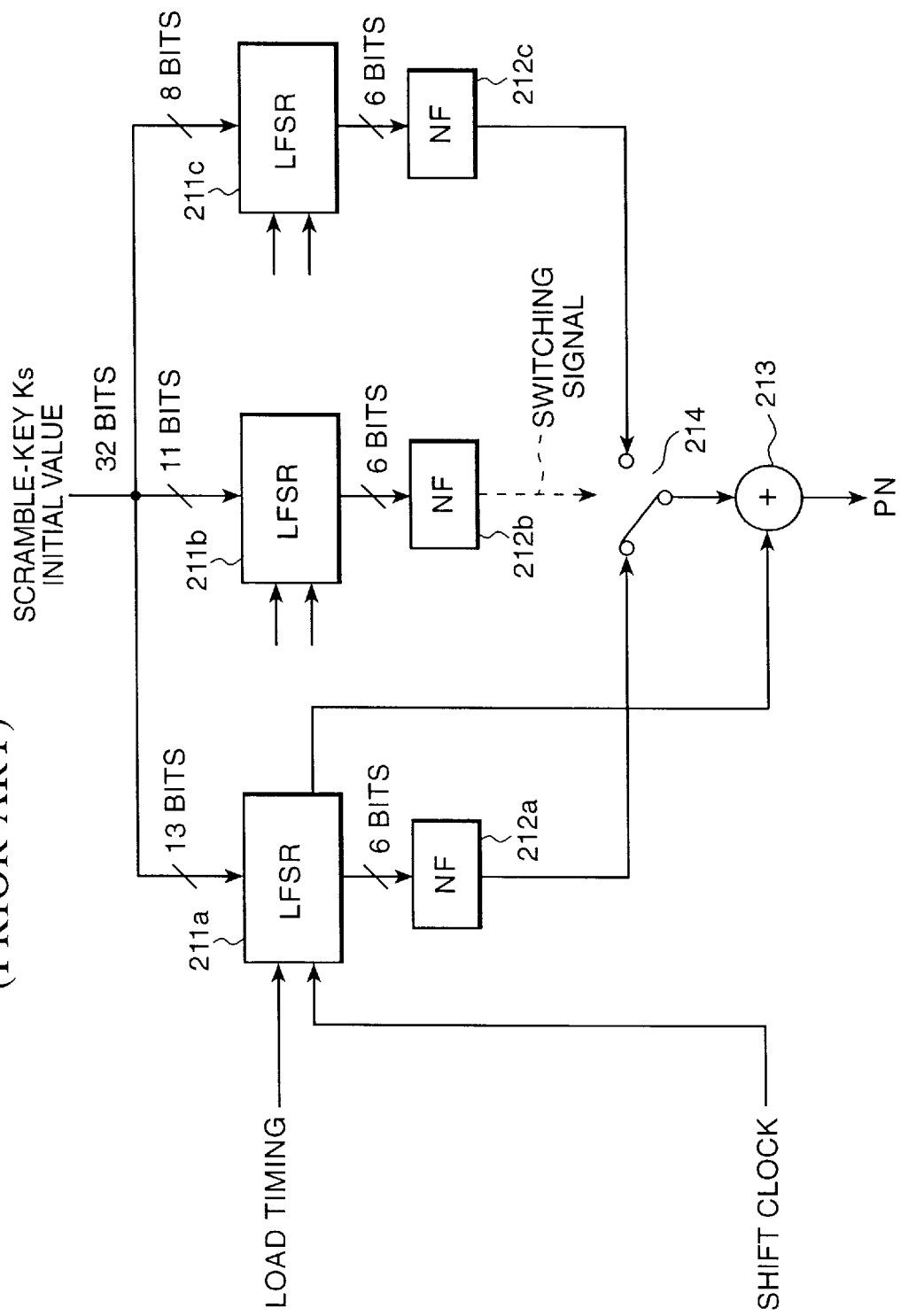
FIG. 4 is a block diagram showing the arrangement of the PN generator used in the decryptor shown in FIG. 3.
Figure 5:
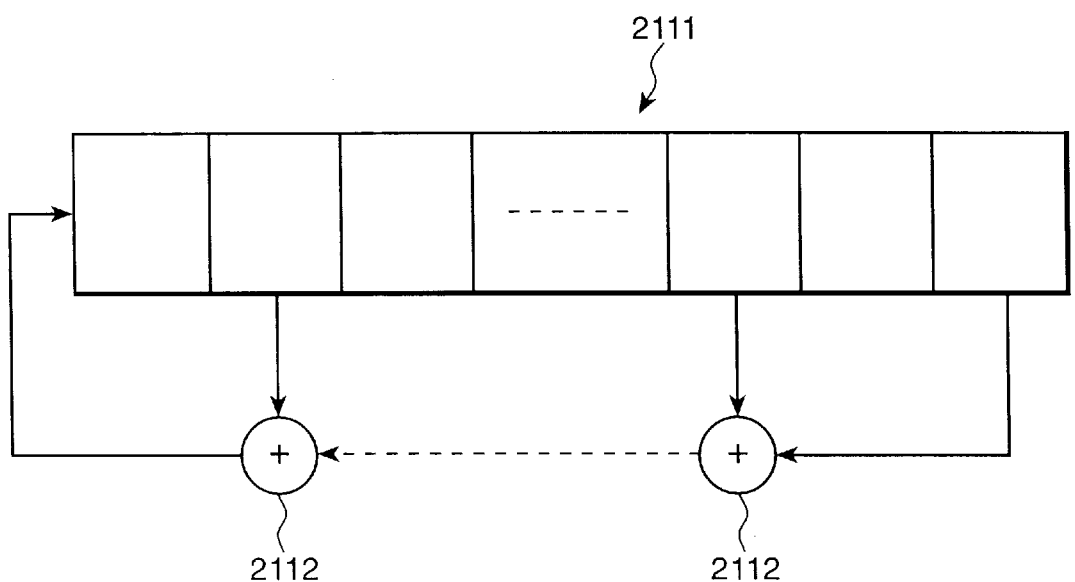
FIG. 5 is a block diagram showing the arrangement of the LFSR used in the PN generator shown in FIG. 4.
Figure 27:
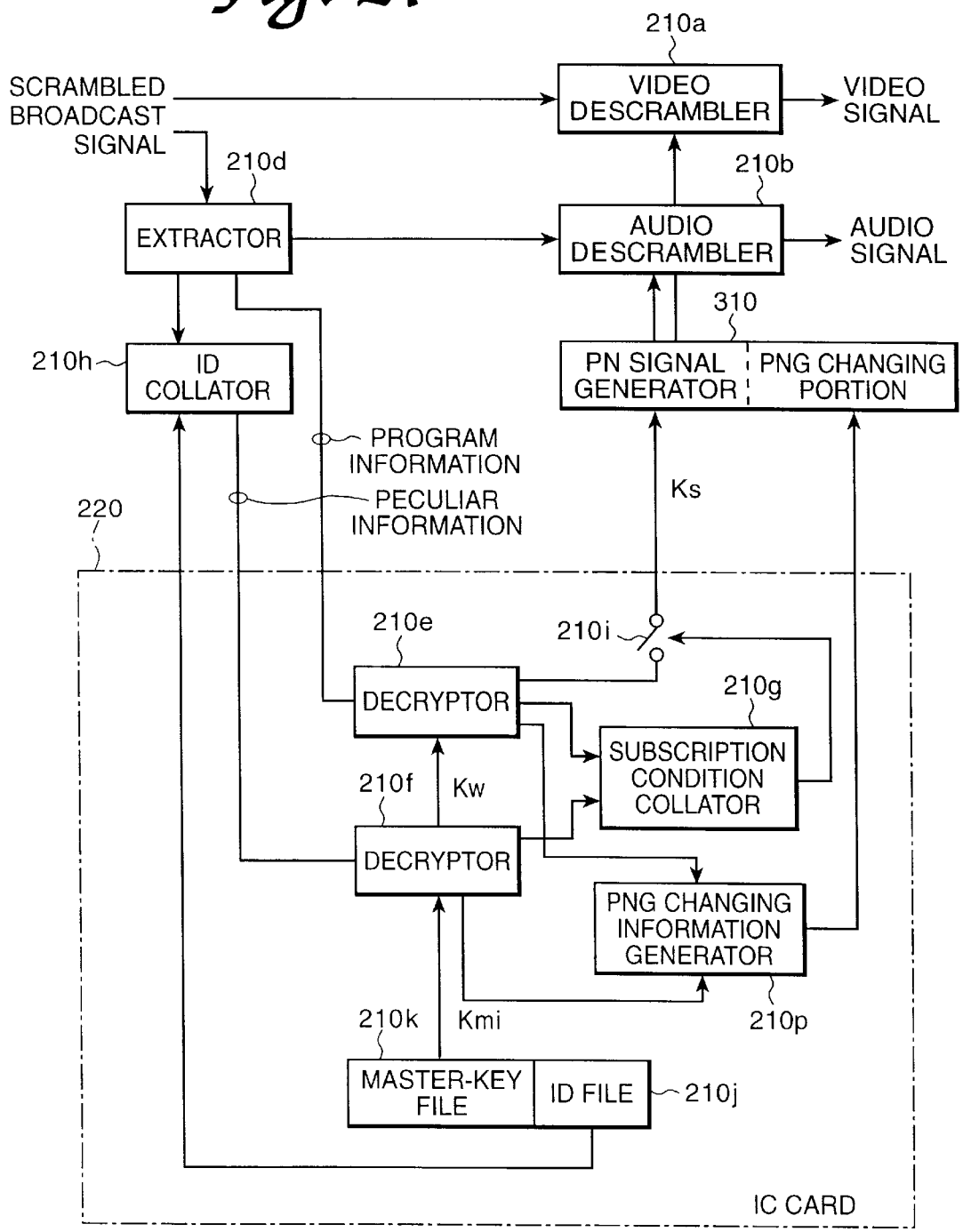
FIG. 27 is a block diagram showing an embodiment of the scrambled broadcast system decryptor according to the present invention.

FIG. 27 is a diagram showing the arrangement of the decryptor of the scrambled broadcast system according to the present invention. In FIG. 27 the same components as those shown in FIG. 2 are assigned with the same marks, and different parts will be explained mainly.

Like the conventional decryptor, the decryptor in the scrambled broadcast system according to the present invention is provided with an extractor 210d for extracting audio signals, program information and peculiar information from sub-signals of the scrambled broadcast signals, a video descrambler 210a for descrambling scrambled video signal of the broadcast signals to convert them into the receivable video signals, an audio scrambler 210d for descrambling the scrambled audio signals obtained from the sub-signals to convert them into the receivable audio signals, and an ID collator 210h for collating an ID contained in peculiar information with an ID from an ID housing memory 210j of an IC card 220.

Further, although various processings are similar to those of the conventional decryptor, the decryptor according to the present invention is characterized in that a partial processing of the microcomputer system and the arrangement of the PN generator 310 are different from those shown in the conventional decryptor.

Figure 29:
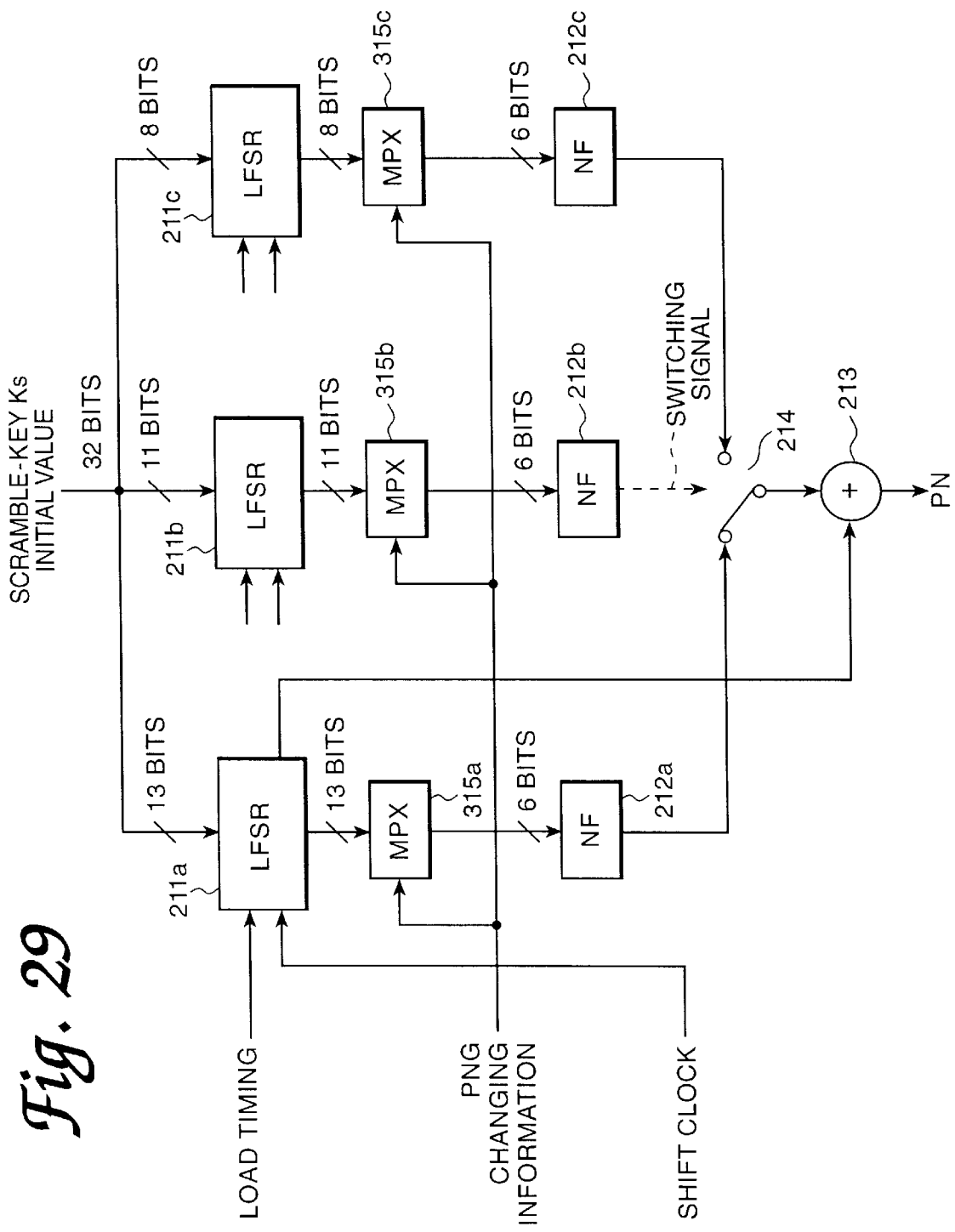
FIG. 29 is a block diagram showing another concrete example of the PN generator 310 used in the embodiment of FIG. 27.
Figure 28:
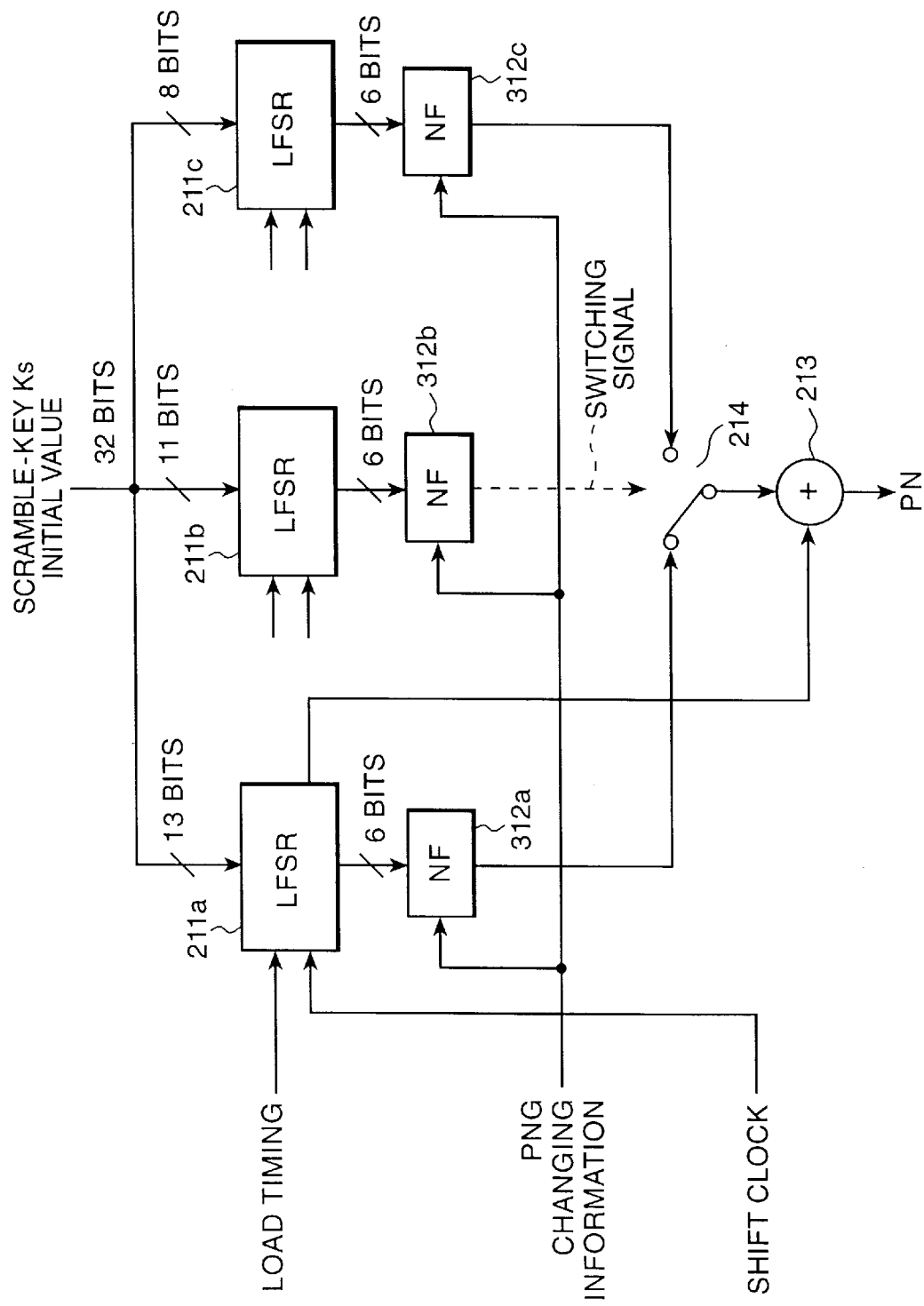
FIG. 28 is a block diagram showing a concrete example of the PN generator 310 used in the embodiment of FIG. 27.
Figure 29:
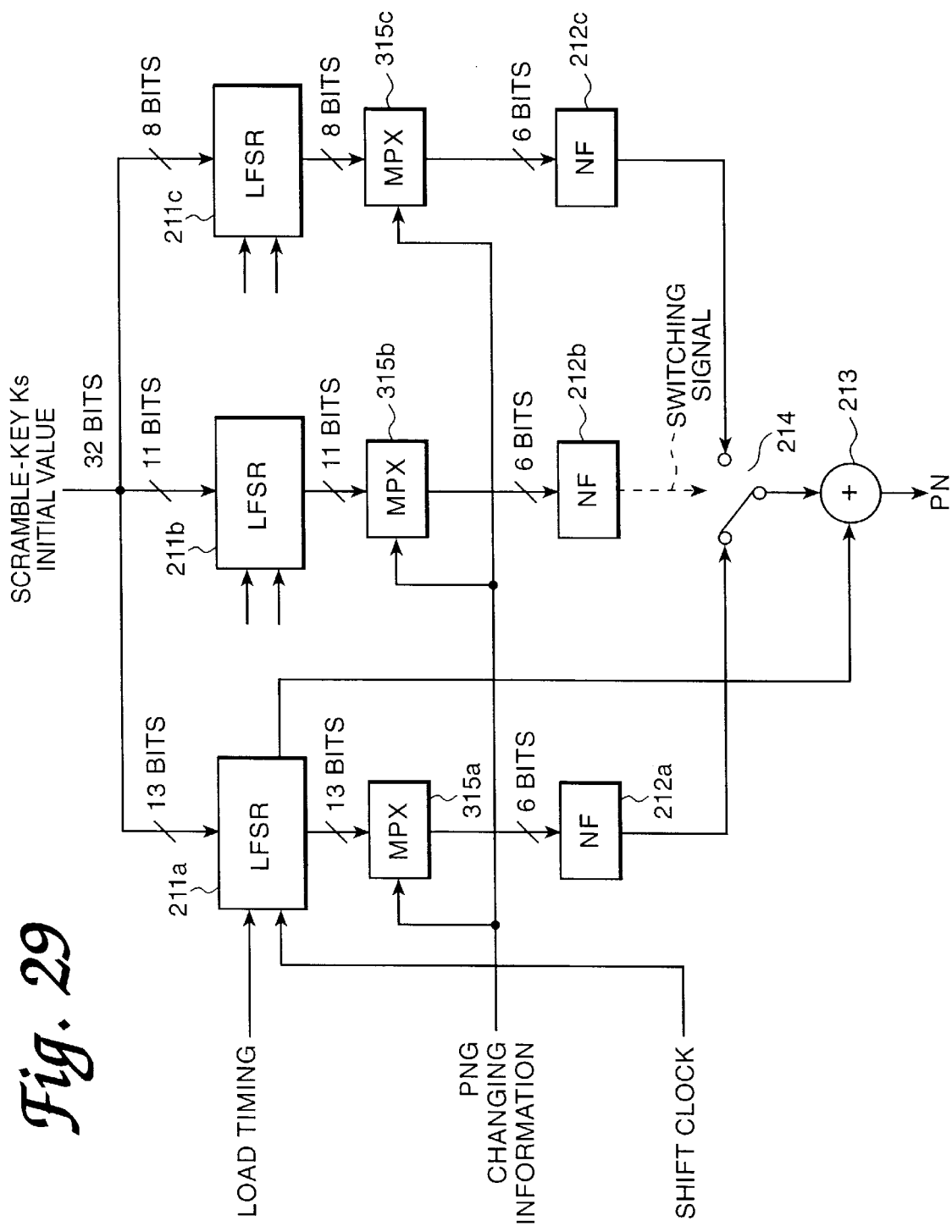

The PN generator 310 changes its state from the initial state fed by the scramble-key and generates the PN signal based on a conversion logic from the shifted state. The PN signal generating logic has a changing processing portion, which is characterized in that the PN signal generating logic is changed based on PNG changing information. FIGS. 28 and 29 show embodiments of the arrangement of the PN generator 310.

The PN generator 310 shown in FIG. 28 is comprised of nonlinear function (NF) logics 312a, 312b, and 312c whose contents are changeable. The LFSRs 211a through 211c receive the 13 bits, the 11 bits and the 8 bits of the scramble-key Ks, respectively, when there are load timing pulses and the states of the LFSRs 211a through 211c change their states from their initial states when the scramble-key Ks is fed according to a shift clock.

The NF logics 312a, 312b ind 312c are comprised of an EEPROM or a RAM whose content is electrically changeable and it is possible to write in the PNG changing information from the microcomputer system of the IC card 220. They convert by nonlinear logic according to the write-in PNG information to output the PN signal generating signal by 1-bit.

The selector switch 214 changes over the NF logics 312a and 312c according to a switching signal from the NF 312b and provide the selected PN signal to the EX-OR 213. The output from a register cell of the LFSR 211a has been fed to the EX-OR 213, and an EX-OR between the outputs of the LFSR 211a and the NF 312a or the NF 312c is fed to a video descrambler 210a and an audio descrambler 210b as the PN signal.

The states of the LFSR 211a through 211c shift from the initial state when the scramble-key Ks is fed according to a shift clock, and outputs of the NF logics 312a through 312c also change following the shift of the states. Although the random PN signal is generated as a result of such state shifting as in the conventional decryptor described above, the PN signal generated from the PN generator 310 shown in FIG. 28 becomes different depending on the PNG changing information written-in the NF logics 312a through 312c.

As described above, the PN generator 310 shown in FIG. 28 changes the conversion logic of the nonlinear logics 312a, 312b and 312c to make the PN signal generating logic changeable.

The PN generator 310 shown in FIG. 29 changes the state outputs of the LFSRs 211a through 211c to make the conversion logic equivalently changeable.

The PN generator 310 shown in FIG. 29 uses the LFSRs 211a through 211c, the NF logics 212a through 212c, the selector switch 214 and the EX-OR 213 which are the same as those shown in the conventional decryptor. Multiplexers 315a through 315c are connected between the LFSRs 212a through 211c and the NF logics 211a through 212c to construct register circuits together with the LFSRs 211a through 211c.

The multiplexer 315a selects 6 bits within the 13 bit register outputs of the LFSR 211a, the multiplexer 315b selects 6 bits within 11 bit register outputs of the LFSR 211b and the multiplexer 315c selects 6 bits within the 8 bit register outputs of the LFSR 211c according to the PNG changing information from the microcomputer system of the IC card 220 and supply the selected outputs to the NF logics 212a through 212c.

The NF logics 212a through 212c are logic circuits which obtain signals for generating PN signals by charging the outputs of the registers. Thus, it becomes possible to make the logic for generating PN signals changeable by changing and supplying the outputs of the LFSRs 211a through 211c to the NF logics 212a through 212c.

In the IC card 220 shown in FIG. 27, a microcomputer system which is a controller has been incorporated. The processing blocks of the microcomputer system are shown in FIG. 27. A master-key Kmi and ID are written-in a master-key file 210k and ID file memory 210j in the IC card 220.

The IC card 220 is provided with a decryptor 210f for decrypting and restoring the signals from the extracted peculiar information using the master-key Kmi in a manner similar to the conventional decryptor, a decryptor 210e for decrypting the program information using the work-key Kw in the peculiar information obtained through decrypting, a subscription condition collator 210g for collating subscription conditions of program information and peculiar information to determine whether the subscription conditions agree with each other, and a switch 210i for supplying the scramble-key Ks extracted from the program information to the PN generator 310.

Accordingly, like the conventional decryptor, when the master-key Kmi and the IDs agree with each other. the subscription conditions also agree with each other, and it is determined that scrambled signals can be descrambled, the switch 210i is turned ON and the scramble-key Ks is applied to the PN generator 210c.

Here, PNG changing information is fed to the changing processing part of the PN generator 310 from the PNG changing information generator 210p which generates the PNG changing information.

The PNG changing information generator 210p takes out a specific data contained in the program information or peculiar information which are decrypted in the decrypts 210e and 210f to output as the PNG changing information.

When the scramble-key Ks is fed to the PN generator 210c according to the processing described above, the PN signals are output based on the conversion logic changed by the PNG changing information to be fed to the video descrambler 210a and the audio descrambler 210b so as to obtain the receivable video signal and audio signal using the descrambling in each descrambler.

The operation of the decryptor shown in FIG. 27 is the same as the conventional decryptor except for the portions related to the PN generator 310 and the PNG changing information generator 210p. Audio signals, program information and peculiar information are extracted from the sub-signal at the extractor 210d and the ID contained in peculiar information is collated with the ID of the IC card 220 in the ID collator 210h, and when they agree with each other, the peculiar information is decrypted using the master-key Kmi in the decryptor 210f of the IC card 220.

Further, program information is decrypted using the work-key Kw of the peculiar information in the decryptor 210e, and when it is determined in the subscription condition collator 210g that the subscription conditions agree with each other, the scramble-key Ks contained in the program information is fed to the PN generator 310.

Here, as the PN signal generating logic is changeable the PN generator 310 shifts the state from the initial state based on the PNG changing information when the PNG changing information is input, and provides the corresponding PN signal to the video descrambler 210a and the audio descrambler 210b to obtain the descrambled video and audio signals.

The PNG changing information in the specific data or the peculiar information is extracted from the program information in the PNG changing information generator 210p, and it can be set up voluntarily at the broadcast station.

For example, the program information and the peculiar information in the broadcast signals are multiplexed to a data line in a vertical retrace interval of the video signal as shown in FIG. 7a. The format of the data line is comprised of a data synchronizing signal area, a data packet area, a data area and a check code area as shown in FIG. 7b.

In the data area the control information is arranged as shown in FIG. 7c. The control information is comprised of the program information which is common information for each decryptor and the peculiar information which is different for each decryptor. There are a channel number and a selecting frequency information as common information in general, and a peculiar address, a channel number and channel selection accepting requirement information as the peculiar information. Here, the PNG changing information is included in the program information (common information). The contents of the PNG changing information can be changed voluntary at the broadcast station.

Thus, the PNG changing information input at the broadcast station is extracted from the program information in the PNG changing information generator 210p at the decryptor, and input to the PN generator 310. So, it is possible to change the state of the PN generator 310 of each decryptor and generate the different PN signal only by changing the contents of the PNG changing information at the broadcast station.

In the decryptor according to the above arrangement, since the PN signal generating logic of the PN generator 310 is voluntarily changeable from the broadcast station the arrangement of the PN generator 310 can not been easily known to unauthorized persons. Therefore, privacy can be retained and security can be reliably kept.

Especially, in a decryptor which feeds the scramble-key to the PN generator from the IC card, since there is no possibility that the arrangement of the PN generator could be known to unauthorized persons from the relation of the scramble-key and the PN signal, it enhances the security of the system and contributes the prevention of the unauthorized use.

Figure 30:
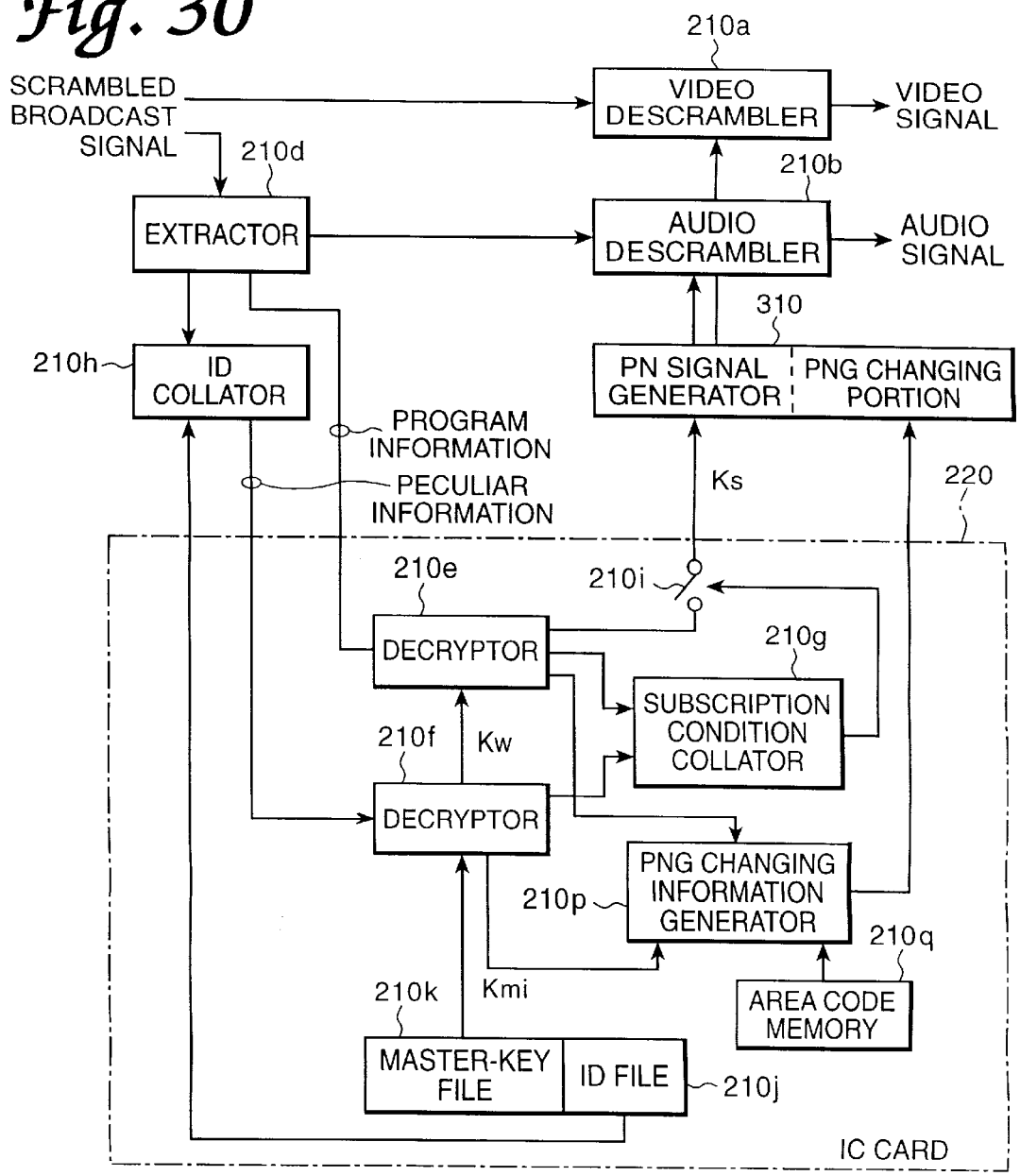
FIG. 30 is a block diagram showing the other embodiment of the decryptor according to the present invention.

FIG. 30 shows the arrangement of one other embodiment of the decryptor according to the present invention. In FIG. 30 the same components as those shown in FIG. 27 are assigned with the same marks.

In the embodiment, an area code memory 210q is set in the IC card 220, an area code which specifies a specific area has been stored in the memory 210q beforehand and the final designated value of the PNG changing information is specified based on the area code.

As the area code, for example a broadcast station code can be employed. According to the arrangement, even though the PN code is decrypted in an area the decryptor can not be employed in another area. Thus, it is possible to limit an area wherein unauthorized use might otherwise be possible into a specific area and to check the expansion of such area.

By the way, in the above embodiment, the PNG changing information can be sequentially transmitted. However, the many PNG changing information may be transmitted beforehand while selected and specified later.

Figure 31:
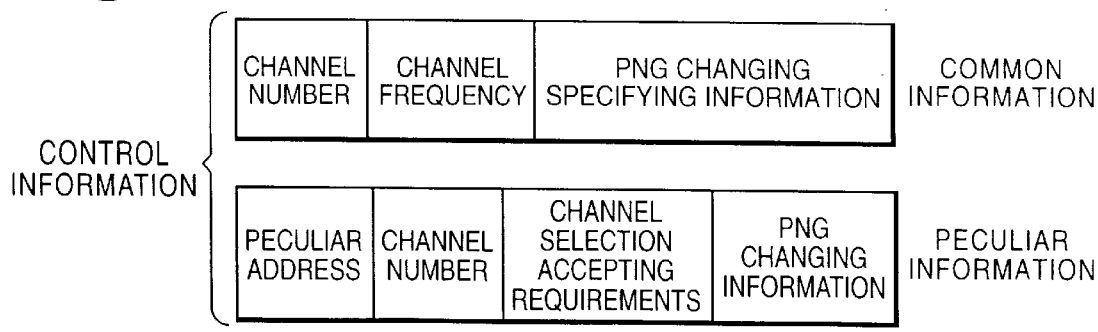
FIG. 31 is a diagram for explaining the transmitting method of the PNG changing information in the PN generator 310 of FIG. 30.

For example, as shown in FIG. 31, PNG changing information specifying information is added to the common information in the control information, i.e., the channel number and the channel frequency, while PNG changing information is added to the peculiar information in the control information, i.e., the peculiar address, the channel number and the channel selection accepting requirements. Then, the decryptor receives the PNG changing information from the peculiar information and it is stored therein. The decryptor also extracts the PNG changing information specifying information from the common information to read out the corresponding PNG changing information. According to such processing the same effect as the above embodiment can be obtained.

Further, in the above embodiments, even though the PN signal generating logic in the decryptor is changed using the IC card, the present invention can ensure the security of the system well enough without using the IC card. In this case the ID is not the same as the ID of the IC card but that which is fed to the main body of the decryptor for instance. Further, the present invention can be devised in various forms without departing from the principle of the present invention.

According to the above embodiments of the present invention, the decryptor of the scrambled broadcast system can improve the security of the system and contribute to the prevention of unauthorized use without requiring a complex arrangement.

As described above, the present invention can provide an extremely preferable scrambled broadcast system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

The foregoing description &,id the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A television signal receiving apparatus for receiving a television signal to which control information for controlling a receiver terminal is multiplexed, comprising:

channel selecting means for selecting a channel on which the control information is multiplexed to the television signal in the state that a power switch of the apparatus is turned OFF; and control means for cutting off power to said channel selecting means, said control means operating based on at least the control information multiplexed to the television signal.

2. A television signal receiving apparatus claimed in claim 1, wherein the control means controls the channel selecting means to select another channel when the control information is not obtained from a channel selected by the channel selecting means during a predetermined time.

3. A television signal receiving apparatus claimed in claim 1, wherein the control means controls the channel selecting means to select a following channel based on a preset order when the control information is not obtained from a channel selected in the channel selecting means during a predetermined lime.

4. A television signal receiving apparatus claimed in claim 1, wherein the control means starts to supply the power to the channel selecting means so as to execute a channel selecting operation using the channel selecting means in the state that a predetermined time has passed after cutting off the power to the channel selecting means.

5. A television signal receiving apparatus claimed in claim 1, wherein the control information contains data showing a transmission schedule of subsequent control information to be transmitted thereafter, and the control means records the transmission schedule contained in the control information and controls whether power is supplied to the channel selecting means based on the transmission schedule in the state that the control information is obtained from the channel selected in the channel selecting means.

6. A television signal receiving apparatus for receiving a television signal to which control information for controlling a receiver terminal is multiplexed, comprising:

channel selecting means for selecting a channel on which the control information is multiplexed to the television signal in the state that power starts being supplied from the exterior and in the state that a power switch of the apparatus is turned OFF; and control means for cutting off power to said channel selecting means, said control means operating based on at least the control information multiplexed to the television signal, wherein the receiver terminal receives external operating information in the state that the control information is obtained from a channel selected by said channel selecting means.

7. A television signal receiving apparatus for receiving a television signal to which control information for controlling a receiver terminal is multiplexed, comprising:

channel selecting means for selecting a channel on which the control information is multiplexed to the television signal in the state that operating information requesting a function which makes use of the data contained in the control information is inputted and in the state that a power switch of the apparatus is turned OFF; and control means for cutting off power to said channel selecting means, said control means operating based on at least the control information multiplexed to the television signal, wherein the receiver terminal executes the function in the state that the control information is obtained from the channel selected by said channel selecting means.

* * * * *